US012731311B2

(12) United States Patent
Yang et al.

(10) Patent No.: US 12,731,311 B2
(45) Date of Patent: Sep. 8, 2026

(54) MEDICAL IMAGE ENHANCEMENT USING AN ARTIFICIAL INTELLIGENCE MODEL WITH EDITABLE OUTPUT IMAGE APPEARANCE CONTROL

(71) Applicant: GE Precision Healthcare LLC, Waukesha, WI (US)

(72) Inventors: Hongxu Yang, Helmond (NL); Xiaomeng Dong, Pleasanton, CA (US); Pál Tegzes, Budapest (HU); Zoltán Kiss, Budapest (HU); Najib Akram Maheen Aboobacker, Waukesha, WI (US); Lehel Mihály Ferenczi, Budapest (HU); Gopal Avinash, San Ramon, CA (US)

(73) Assignee: GE Precision Healthcare LLC, Waukesha, WI (US)

( * ) Notice: Subject to any disclaimer, the term of this patent is extended or adjusted under 35 U.S.C. 154(b) by 224 days.

(21) Appl. No.: 18/616,369

(22) Filed: Mar. 26, 2024

(65) Prior Publication Data

US 2025/0307993 A1 Oct. 2, 2025

(51) Int. Cl.

*G06T 5/60* (2024.01)
*G06T 5/10* (2006.01)
*G06T 11/60* (2026.01)

(52) U.S. Cl.

CPC .................. *G06T 5/60* (2024.01); *G06T 5/10* (2013.01); *G06T 11/60* (2013.01);

(Continued)

(58) Field of Classification Search

None

See application file for complete search history.

(56) References Cited

U.S. PATENT DOCUMENTS 11,257,191 B2 * 2/2022 Litwiller .................. G06N 3/04
11,557,036 B2 * 1/2023 Liao .......................... G06T 7/30

(Continued)

OTHER PUBLICATIONS

Zhang et al. “Learning Fully Convolutional Networks for Iterative Non-blind Deconvolution”—2017 IEEE Conference on Computer Vision and Pattern Recognition—9 pages 2017 (Year: 2017).*

Valsesia et al. “Deep Graph-Convolutional Image Denoising”—IEEE Transactions on Image Processing, vol. 29, 2020 pp. 8226-8237 (Year: 2020).*

(Continued)

*Primary Examiner* — Tammy Paige Goddard

(74) *Attorney, Agent, or Firm* — Amin, Turocy & Watson, LLP

(57) ABSTRACT

Medical image enhancement processing techniques are described that employ an artificial intelligence (AI) model with editable output image appearance control. An example, computer-implemented method comprises generating a transformed version of a medical image via execution of an AI transformation model on the medical image, wherein the AI transformation model comprises a neural network that predicts values of parameters of a transformation function based on processing the medical image, or a down sampled version thereof, via the neural network, and a transformation module that generates the transformation function using the values and applies the transformation function to the medical image, resulting in generation of the transformed version of the medical image. The AI transformation model comprises an editable output image appearance control functionality that enables a user to control and edit the transformation operations performed by the transformation function on the medical image in association with viewing the results in real-time.

20 Claims, 15 Drawing Sheets

(52) U.S. Cl.
CPC .................... *G06T 2200/24* (2013.01); *G06T 2207/20081* (2013.01); *G06T 2207/20084* (2013.01); *G06T 2207/20092* (2013.01); *G06T 2207/30004* (2013.01); *G06T 2210/41* (2013.01)

(56) References Cited

U.S. PATENT DOCUMENTS

| | | | | |
|---|---|---|---|---|
| 2019/0156526 | A1* | 5/2019 | Liu | G16H 30/40 |
| 2021/0225047 | A1* | 7/2021 | Pawar | G01R 33/56509 |
| 2022/0130084 | A1* | 4/2022 | Litwiller | G06V 10/26 |
| 2023/0071535 | A1* | 3/2023 | Abrol | G06V 10/25 |

OTHER PUBLICATIONS

Stamatios Lefkimmiatis "Universal Denoising Networks: A Novel CNN Architecture for Image Denoising"—2018 IEEE/CVF Conference on Computer Vision and Pattern Recognition pp. 3204-3213 2018 (Year: 2018).*

Yang, et al., "Deep Learning Image Processing," U.S. Appl. No. 18/064,541, filed Dec. 12, 2022.

Zeng, et al. "Learning image-adaptive 3d lookup tables for high performance photo enhancement in real-time." IEEE Transactions on Pattern Analysis and Machine Intelligence 44.4 (2020): 2058-2073.

Li, et al. "FlexiCurve: Flexible Piecewise Curves Estimation for Photo Retouching." Proceedings of the IEEE/CVF Conference on Computer Vision and Pattern Recognition, Date of Conference: Jun. 17-24, 2023, DOI: 10.1109/CVPRW59228.2023.00116.

* cited by examiner

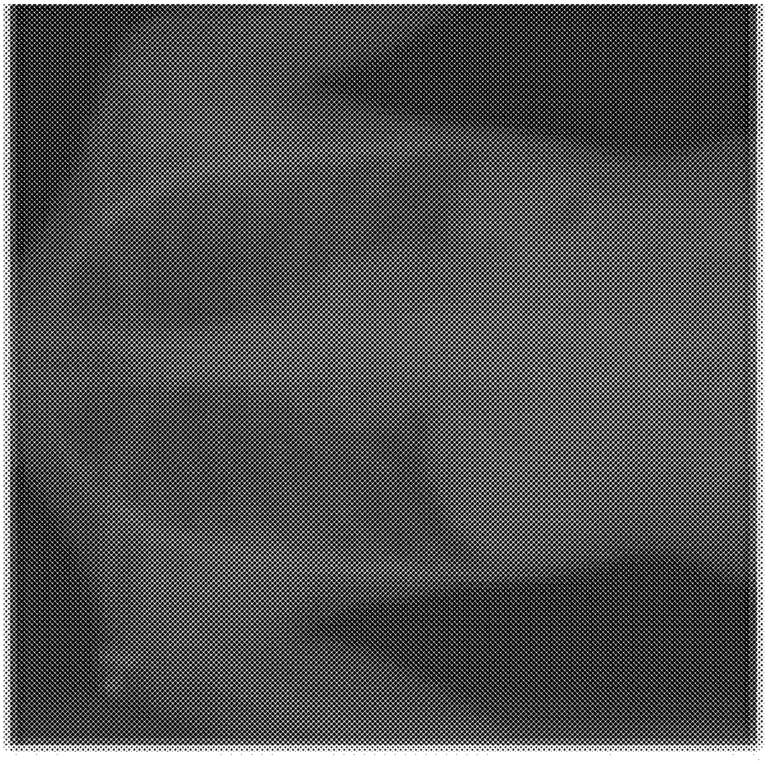
Example Input Medical Image
202
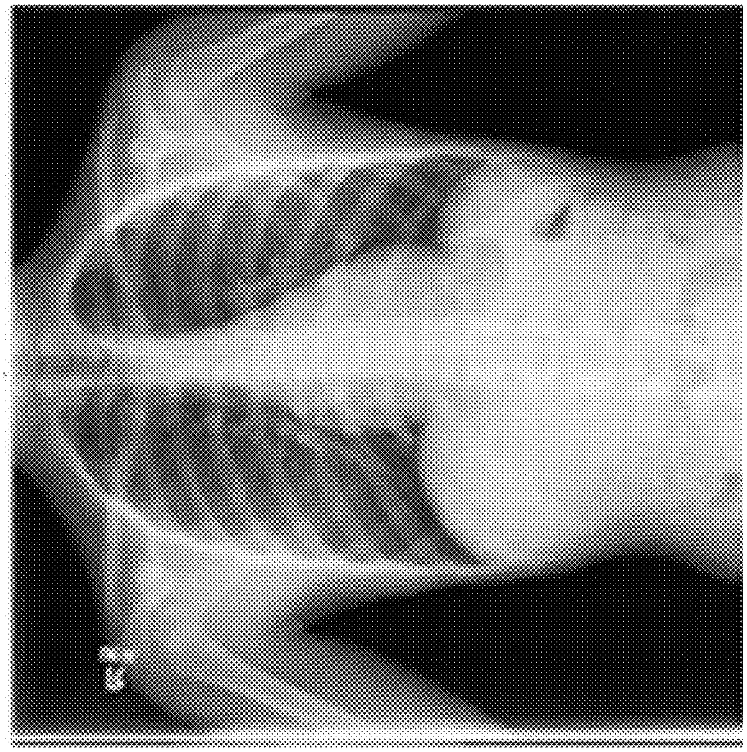
Example Output Medical Image
204
FIG. 2

701

702

703

TE Function LUC

BC Function LUC

Control point (Select and move control points to change the shape of the LUC)

k1 k2 k3 m1 m2 m3 contrast 0.89 brightness 1.0

1200

Generating, by a system operatively coupled to a processor, a transformed version of a medical image via execution of an artificial intelligence model on the medical image, wherein the artificial intelligence model comprises a transformation function — 1202

Rendering, by the system, the transformed version of the medical image on an electronic display — 1204

Providing, by the system, via a graphical user interface rendered on the electronic display, an editing tool that facilitates receiving user input indicating an adjustment to one or more values of one or more parameters of the transformation function that control an appearance of the transformed version — 1206

Updating, by the system in response to reception of the user input, the transformation function in accordance with the adjustment, resulting in an updated version of the transformation function — 1208

Generating, by the system, an updated transformed version of the medical image via application of the updated version of the transformation function to the medical image — 1210

Rendering, by the system, the updated transformed version of the medical image on the electronic display — 1212

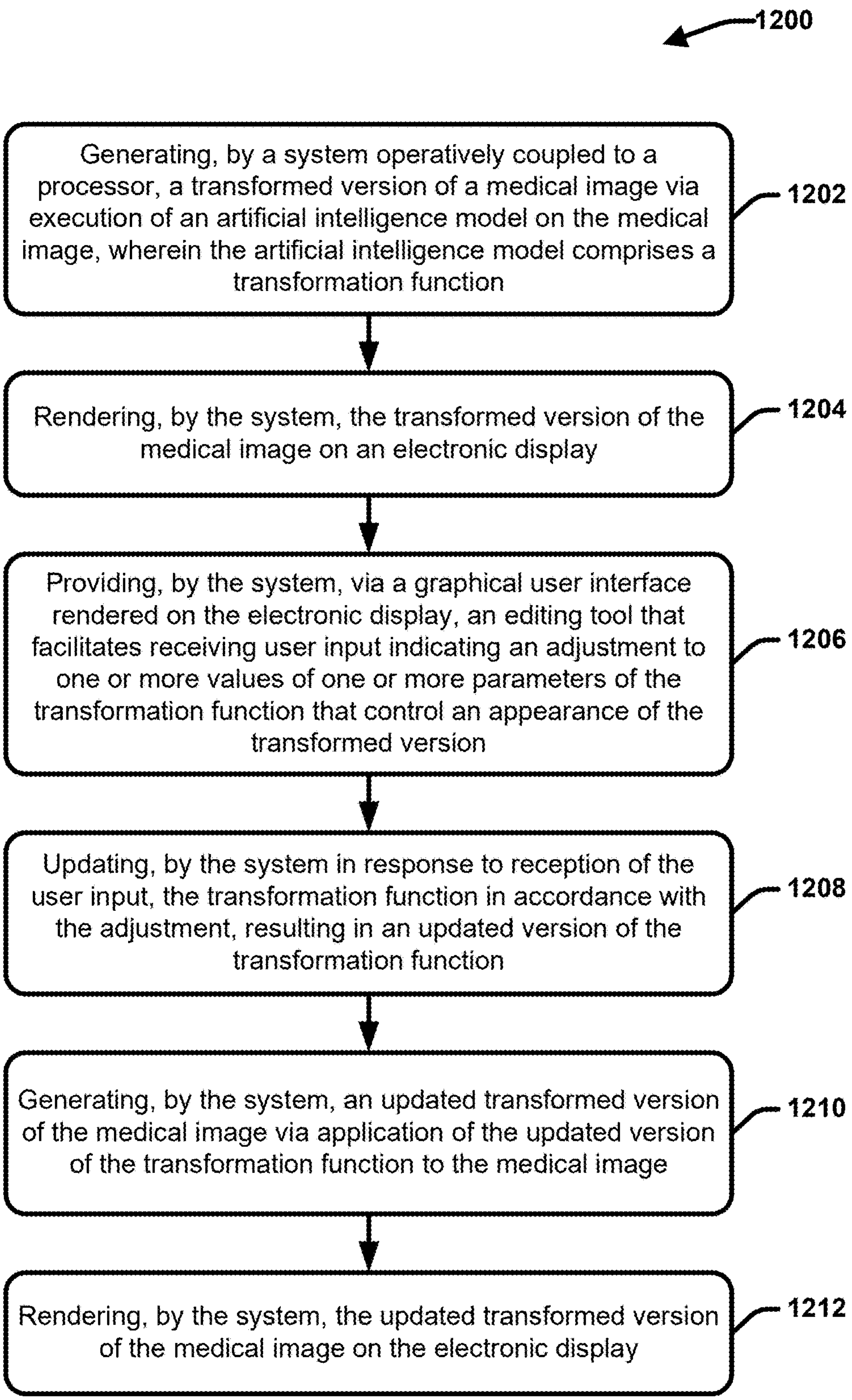

FIG. 12

MEDICAL IMAGE ENHANCEMENT USING AN ARTIFICIAL INTELLIGENCE MODEL WITH EDITABLE OUTPUT IMAGE APPEARANCE CONTROL

TECHNICAL FIELD

This application relates to medical image processing, and more particularly to medical image enhancement using an artificial intelligence (AI) model with editable output image appearance control.

BACKGROUND

Medical imaging plays a crucial role in diagnosis, treatment planning, and monitoring of various medical conditions, and enhancing the quality of medical images can aid healthcare professionals in making more accurate and reliable clinical decisions. Artificial intelligence (AI) based medical image enhancement refers to the application of AI techniques to improve the quality, resolution, or interpretability of medical images. The image enhancement generally involves transforming the original medical image via an AI model into a transformed version of the original image with an optimized appearance. Compared to conventional image processing-based solutions, AI solutions can provide more consistent and stable processing results.

To facilitate this end, many existing AI based medical image enhancement techniques train an AI model to directly infer the transformed version of the medical image. Unfortunately, such techniques are prone to exacerbating visual artifacts in the output medical image and can be excessively computationally expensive owing to complex model design requirements, especially for high-resolution medical images. In addition, such techniques train the AI model to generate output images having predefined visual properties which cannot be adjusted at runtime (e.g., during inferencing mode or during execution thereof after training), thus restricting the AI model's applicability to only those entities who desire enhanced medical images having the predefined visual properties.

Accordingly, improved AI solutions for medical image enhancement that address these limitations are desirable.

SUMMARY

The following presents a summary to provide a basic understanding of one or more embodiments of the invention. This summary is not intended to identify key or critical elements or delineate any scope of the different embodiments or any scope of the claims. Its sole purpose is to present concepts in a simplified form as a prelude to the more detailed description that is presented later. In one or more embodiments described herein, systems, computer-implemented methods, apparatus and/or computer program products are described that facilitate medical image enhancement using an AI model with editable output image appearance control.

According to an embodiment, a system is provided that comprises a memory that stores computer-executable components, and a processor that executes the computer-executable components stored in the memory. The computer-executable components comprise an execution component that generates a transformed version of a medical image via execution of an AI transformation model on the medical image, wherein the AI transformation model comprises a neural network that predicts values of parameters of a transformation function based on processing the medical image or a down sampled version of the medical image via the neural network, and a transformation module that generates the transformation function using the values and applies the transformation function to the medical image, resulting in generation of the transformed version of the medical image. The computer-executable components can further comprise a rendering component that renders the transformed version of the medical image on an electronic display via a graphical user interface.

In various embodiments, the graphical user interface comprises an editing tool that facilitates receiving user input indicating an adjustment to one or more of the values that control an appearance of the transformed version. With these embodiments, in response to reception of the user input, the transformation module updates the transformation function in accordance with the adjustment, resulting in an updated version of the transformation function, and applies the updated version of the transformation function to the medical image, resulting in generation of an updated transformed version of the medical image. The rendering component further renders the updated transformed version of the medical image on the electronic display via the graphical user interface. In this regard, the AI model comprises an editable output image appearance control functionality that enables the end user to control (e.g., via the editing tool) the transformation operations performed by the transformation function on the medical image to achieve a desired output image appearance in association with viewing changes to the output image appearance in real-time.

In some embodiments, elements described in the disclosed systems and methods can be embodied in different forms such as a computer-implemented method, a computer program product, or another form.

DESCRIPTION OF THE DRAWINGS

FIG. 2 illustrates an example input medical image and an enhanced version of the input medical image, in accordance with one or more embodiments of the disclosed subject matter.

FIG. 12 presents a flow diagram of another example, computer-implemented method that facilitates medical image enhancement using an AI transformation model with editable output image appearance control, in accordance with one or more embodiments of the disclosed subject matter.

DETAILED DESCRIPTION

Figure 1:
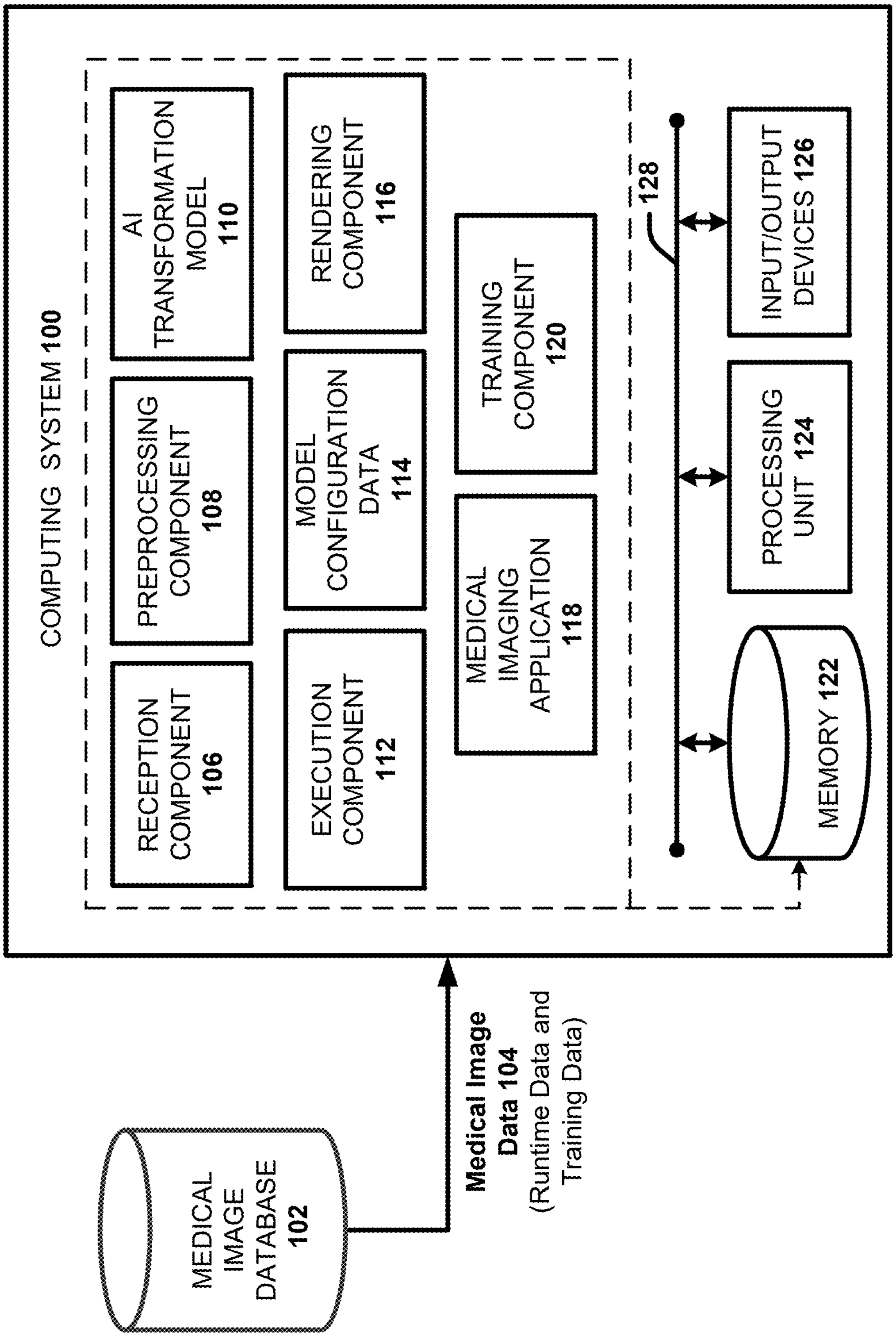
FIG. 1 presents an example system that facilitates medical image enhancement using an AI transformation model with editable output image appearance control, in accordance with one or more embodiments of the disclosed subject matter.

The following detailed description is merely illustrative and is not intended to limit embodiments and/or application or uses of embodiments. Furthermore, there is no intention to be bound by any expressed or implied information presented in the preceding Background section, Summary section or in the Detailed Description section.

The disclosed subject matter is directed to systems, computer-implemented methods, apparatus and/or computer program products that facilitate medical image enhancement using an AI transformation model with editable output image appearance control, in accordance with one or more embodiments of the disclosed subject matter. More particularly, the AI transformation model employs a deep learning-based method to generate an editable transformation function that can be used to perform pixel intensity-based transformation operations on a medical image (e.g., brightness level transformation operations, contrast level transformation operations, tissue equalization transformation operations, and others).

In this regard, in association with execution of the AI transformation model on a medical image, the AI transformation model generates a transformation function tailored to the medical image and one or more desired transformation operations to be applied to the medical image (e.g., brightness level transformation operations, contrast level transformation operations, tissue equalization transformation operations, and others). The AI transformation model further applies the transformation function to the medical image, resulting in transforming the medical image into a transformed or enhanced version thereof. The tailored transformation function is further editable within the AI transformation model itself, which enables the ability to interactively edit the resulting transformed medical image iteratively in real-time as displayed via a graphical user interface (GUI) and using a corresponding editing functionality provided via the GUI. In this regard, the editing operations are effectuated within the AI transformation model itself in association with updating the transformation function based on user input indicating a desired update to one or more control parameter values of the transformation function that control the appearance of the output image. Based on reception of the user input, the AI transformation model generates an updated version of the editable transformation function and reapplies the edited version of the transformation function to the medical image, resulting in generation of an updated transformed version of the medical image.

To facilitate this end, the AI transformation model includes a combination of a neural network module and a transformation module. The neural network model comprises a neural network configured to predict values of control parameters required to construct a version of a predefined transformation function tailored to a given input medical image based on processing the medical image, or a down-sampled version of the medical image via the neural network. In various embodiments, the neural network comprises an image encoder followed by a plurality parameter prediction layers. In various embodiments, the image encoder can correspond to a simple convolutional neural network (CNN), such as a CNN having less than one hundred thousand parameters, and the parameter prediction layers can comprise neural network regression layers. The image encoder is configured to generate extracted features or feature embeddings of the medical image or a down-sampled version thereof (wherein processing the down-sampled version as opposed to the higher resolution original input image results in reducing processing time and the amount of processing power required). The parameter prediction layers in turn process the extracted feature embeddings to predict the values of the control parameters. The transformation module then constructs the version of the predefined transformation function using the values and applies the constructed transformation function to the medical image, resulting in transforming the medical image into a transformed version thereof having a desired transformed or enhanced appearance relative to the medical image. For example, in various embodiments, the enhanced appearance can correspond to an optimized level of brightness, contrast, tissue equalization, or another type of change in appearance based on adjusting the intensity values of pixel or voxels of the medical image.

To this end, the predefined transformation function can correspond to one or more differential functions defined by mathematical equations that control how to adjust pixel intensity values of some or all of the pixels of the medical image to change the appearance of the medical image into the enhanced appearance as a function of defined control parameters. In other words, the predefined transformation function can include any differential transformation function that can be used to compute a mapping between original intensity values of respective pixels of the medical image and target pixel intensity values for the respective pixels as included in the transformed version of the medical image having the desired transformed or enhanced appearance, wherein the mapping is controlled based on defined control parameters and defined mathematical relationships between the control parameters. Because the generated transformation function corresponds to a mapping between input image and output image pixel intensities, the generated transformation function can be graphically represented as a graphical look-up curve (LUC). The neural network module predicts the values of the control parameters as tailored to the medical image, and the transformation module then generates a tailored version of the predefined transformation function, corresponding to a tailored mapping or tailored LUC, in accordance with the defined mathematical equations using the predicted control parameter values and the original pixel intensity values. The transformation module then adjusts the pixel intensity values of the medical image in accordance with the tailored mapping or tailored LUC to generate the transformed version of the medical image.

To this end, because the predefined transformation function comprises a differential function, the particular values of the control parameters applicable to effectuate the desired appearance transformation to the medical image can be learned during training of the AI transformation model. In various embodiments, the disclosed techniques train the AI transformation model using training medical images and ground truth transformed versions of the training medical images. The ground truth transformed versions can be obtained via any suitable mechanism. To this end, the training data does not require any annotation data applied to the training medical images in the parameter space or any labels of good/bad images, only ground truth exemplars of how the transformed version of each training medical image should appear. In this regard, the training process involves, for each training image, processing the training image (or a down-sampled version thereof) via the neural network module to predict values defined control parameters of the transformation function, generating a tailored version of the transformation function for the training medical image using the predicted values, applying the tailored version of the transformation function to the training medical image to generate the transformed version, computing a loss using a suitable loss metric based on a measure of similarity between the transformed version and the corresponding ground truth transformed version, and updating or tuning the neural network (e.g. the image encoder and/or the parameter prediction layers) of the neural network module based on the loss. Once trained, the neural network module will be configured to accurately predict the correct values of the parameters of the transformation function needed to construct a version of the transformation function applicable to transform any given input image into a transformed version having an appearance corresponding to the target appearance.

During inferencing mode, the neural network portion of the AI transformation model is executed on a given input medical image only once to generate the predicted parameter values of the transformation function. For example, in association with processing a new input medical image during inferencing mode, the neural network module processes the input medical image (or a down-sampled version thereof), via the trained image encoder and parameter prediction layers to generate the predicted parameter values. The transformation module further generates and applies an initial version of the transformation function to the input medical image to generate the first or initial transformed version thereof, which has the target appearance for which the AI transformation model was trained to generate. This initial transformed version generated via the first pass of the AI transformation model is referred to herein as the default transformed version (e.g., the default version that the AI transformation model was trained to generate).

The default transformed version of the input medical image can further be presented (e.g., displayed, rendered, etc.) to an end user (e.g., a medical professional such as a radiologist, or another suitable entity) via a GUI of a medical imaging application that facilitates reviewing and editing the displayed medical image. For example, the medical imaging application can include an editing tool that allows the user to edit the appearance of the transformed version displayed in real-time based on the user's preferences. The real-time editing is effectuated based by the transformation module based on adjusting the initial version of the transformation function, wherein the adjusting is based on adjusting one or more of the predicted parameter values used to construct the initial version of the transformation function. In this regard, the editing tool can provide a mechanism via which the user can provide input indicating an adjustment to one or more of predicted parameter values. The mechanism via which the editing tool receives such user input can vary. For example, in some embodiments, the editing tool can present interactive sliders corresponding to the control parameters of the transformation function, wherein moving the positions of the sliders corresponds to user input increasing or decreasing values of corresponding control parameters. In another example, the editing tool can present an interactive version of the graphical LUC representation of the transformation function, wherein the interactive version can include interactive control points that can be adjusted to change the shape of the LUC, which in turn corresponds to changing one or more values of the control parameters.

In this regard, in response to reception of user input indicating an adjustment to one or more values of the control parameters of the transformation function, the transformation module updates the transformation function accordingly and reapplies the updated transformation function to the input medical image to generate an updated transformed version thereof, which is in-turn rendered in real-time via the GUI. This process can be repeated any number of times as desired by the user based on providing new input via the editing tool. Because the edited or updated transformed versions are generated based on adjusting the original predicted values of the transformation function to construct different version of the transformation function, and do not involve re-processing the input medical image via the neural network of the AI transformation model, the duration of the processing time involved in updating and reapplying the transformation function to generate an updated transformed version is less than one second, and even on the order of about 10 milliseconds in some embodiments. Thus, with the disclosed techniques, the user can view the results of editing operations applied to a rendered, transformed version of the medical image in real-time. In this context, the term real-time refers to generating and rendering an updated transformed version of the medical image in less than 1 second or even about 10 milliseconds following provision of user input indicating a desired editing operation.

The disclosed techniques provide several technical advantages over existing AI based medical image enhancement techniques. Firstly, as noted above, the disclosed techniques provide for editing of the output image generated by the AI transformation model, and further enable such editing to be performed in real-time in a seamless manner. This is achieved because all of the editing operations are realized after the neural network processing operations by the image encoder and the parameter prediction layers have been performed and are not repeated during the editing operations. In this regard, the editing operations are directly based on modifying values of parameters of the transformation function. In other words, the editing operations are based on user interaction in the transformation function parameter space, to fine tune the output image into a customizable result. By enabling the end user to edit and customize the appearance of the output image generated by the AI transformation model during the inferencing stage, the AI transformation model becomes more applicable to different users who desire different looks for the final output image. In addition, the editing interactions and resulting impacts of the editing operations are interpretable in both the imaging space and the parameter space. In this regard, the designed transformation function, as graphically represented as a LUC, mimics the human behavior, and interaction in the parameter space can be effectuated by changing the position of control points on the LUC as displayed and viewing how these changes influence the appearance of the output image.

Further, the editing operations are integrated within the AI transformation model itself during the inferencing stage. Thus, the AI transformation model has a tunable end-to-end structure and does not employ auxiliary post-processing image processing modules to separately perform editing operations on the output image generated by the AI transformation model. As a result, in comparison to other AI based image processing image processing solutions that employ auxiliary modules to separately perform editing operations on the output image generated via an AI based model, the disclosed solution requires significantly fewer computational resources with respect to memory storage required to store the image processing components, and processing power required to execute the image processing components. Further, owing to the simple, end-to-end design of the AI transformation model, the processing time or speed required to execute the model to generate and edit the initial, default transformed version is significantly reduced compared to more complex AI based solutions combined with auxiliary image processing modules adapted to achieve similar results.

In addition, the neural network architecture employed by the AI transformation model uses only a CNN based image encoder combined with regression layers. To this end, because the neural network employed by the AI transformation model only predicts parameter values of the transformation function and does not perform directly transform an input image into the enhanced version, the neural network employed by the AI transformation model does not include an encoder-decoder structure required for such direct AI based image-to-image transformation. To this end, the neural network employed by the AI transformation model does not perform down-sampling and up-sampling operations on the input medical image in association with transforming the input medical image. In addition to such direct image-to-image AI based medical image transformation models requiring auxiliary image processing modules to provide output image editing functionality, such down-sampling and up-sampling operations commonly result in the output image having artifacts (e.g., blurring, distortions, and other types of artifacts). On the contrary, the neural network of the subject AI transformation model merely processes the input medical image or a down-sampled version thereof, to predict the values of the parameters of the transformation function, and the transformation module of the AI transformation model applies the transformation function generated based on the values to the original, high resolution input image to transform the medical image based on per pixel intensity. As a result, the output images generated by the AI transformation model do not include any artifacts.

Further, owing to the simplicity of the neural network architecture of the subject AI transformation model comprising only a CNN based image encoder and a parameter prediction layers, the computational resources required to store (e.g., the amount of memory required) and execute (e.g., the amount of processing power and processing speed) the neural network are significantly reduced compared to other direct image-to-image AI based transformation models. For example, in some implementations, the CNN based image encoder can comprise a simple encoder with less than one hundred thousand parameters (e.g., preferably around sixty thousand parameters or less), as compared to other CNN based image encoders that can have tens of millions of parameters or more.

Finally, the subject AI transformation model is much easier to train and maintain compared to other AI based image-to-image transformation solutions. In this regard, the training dataset required to train the subject AI transformation model only requires ground truth enhanced version of the training images. On the contrary, other AI based deep-learning models adapted to perform similar image transformations without the editing functionality afforded by the subject AI transformation model require careful annotation in image enhancement, intermediate parameters and segmentation masks, which leads to laborious work and significant time for model training and development. In contrast, the proposal just needs only a simple tuning of the required image look, which can be done efficiently with existing medical image annotation tools and without complex segmentation masks.

The disclosed solution is also modality-independent. In this regard, the types of medical images processed by the disclosed AI transformation model can include medical images captured using various types of image capture modalities. For example, the medical images can include (but are not limited to): radiation therapy (RT) images, X-ray (XR) images, digital radiography (DX) X-ray images, X-ray angiography (XA) images, panoramic X-ray (PX) images, computerized tomography (CT) images, mammography (MG) images (including a tomosynthesis device), a magnetic resonance imaging (MRI or simply MR) images (including T1-weighted images and T2-weighted images), ultrasound (US) images, color flow doppler (CD) images, position emission tomography (PET) images, single-photon emissions computed tomography (SPECT) images, nuclear medicine (NM) images, optical, DWI and the like. The medical images can also include synthetic versions of native medical images such as synthetic X-ray (SXR) images, modified or enhanced versions of native medical images, augmented versions of native medical images, and the like generated using one or more image processing techniques. The types of medical image data processed/analyzed herein can include two-dimensional (2D) image data, three-dimensional image data (3D) (e.g., volumetric representations of anatomical regions of the body), and combinations thereof.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Turning now to the drawings, FIG. 1 illustrates a block diagram of an example, non-limiting computing system 100 that facilitates medical image enhancement using an AI model with editable output image appearance control, in accordance with one or more embodiments of the disclosed subject matter. Embodiments of systems described herein can include one or more machine-executable or computer-executable components embodied within one or more machines (e.g., embodied in one or more computer-readable storage media associated with one or more machines). Such components, when executed by the one or more machines (e.g., processors, computers, computing devices, virtual machines, etc.) can cause the one or more machines to perform the operations described.

For example, computing system 100 includes several machine/computer-executable components, including reception component 106, preprocessing component 108, AI transformation model 110, execution component 112, rendering component 116, medical imaging application 118 and training component 120. These computer/machine executable components can be stored in memory 122 of the computing system 100, which can be coupled to (at least one) processing unit 124 for execution thereof. Memory 122 can also store any information or data received by, used by and/or generated by the computing system 100 related to performing the operations of the machine/computer-executable components described herein. Such information can include (but is not limited to), model configuration data 114, medical image data 106, and enhanced versions of medical images generated by the computing system 100. Computing system 100 can also include one or more input/output devices 126 that facilitate receiving user input and/or rendering output data to users in association with usage of the features and functionalities of the machine/computer-executable components. Computing system 100 also includes a system bus 128 that communicatively and operatively couples the memory 122, the processing unit 124 and the input/output devices 126 to one another. Examples of said and memory, processing unit, input/output devices 126, and other suitable computer or computing-based elements, can be found with reference to FIG. 13 and can be used in connection with implementing system or components shown and described in connection with FIG. 1 and other figures disclosed herein.

In accordance with various embodiments, computing system 100 is configured to process medical image data 104. The medical image data 104 can include runtime data, corresponding to one or more medical images that are processed by the computing system 100 (e.g., via execution component 112) via a trained version of AI transformation model 110, resulting in transforming the respective medial images into transformed versions thereof (e.g., enhanced versions or otherwise modified versions thereof). The medical image data 104 can also include training data, corresponding to a training dataset of training medical images paired with ground-truth transformed versions, that the computing system 100 uses to train the AI transformation model 110 (e.g., via training component 120). The medical image data 104 can be obtained (e.g., received, extracted from, retrieved from, etc.) by the reception component 106 from a medical image database 102 and/or any suitable network accessible source, system, or device (e.g., another database, another medical image processing system, a medical image acquisition system, etc.). For example, as shown in FIG. 1, computing system 100 can be electronically integrated, via any suitable wired or wireless electronic connection, with the medical image database 102 and/or any other suitable network accessible source, system, or device from which the medical image data 104 may be electronical obtained by the reception component 102. Additionally, or alternatively, the medical image data 104 can be stored locally by the computing system 100 (e.g., in memory 122 or the like).

The particular type of medical images included in the medical image data 104 processed by the computing system 100 can vary. In this regard, the disclosed techniques are directed to training and employing an AI transformation model 110 to generate transformed versions of respective input medical images. The particular type of the input medical images, such as the particular modality (e.g., XR, CT, MR, PET, etc.), the anatomical region depicted, the dimensionality (e.g., 2D or 3D), the acquisition parameters, and so on, can vary. In this regard, the disclosed techniques can be used to generate different versions of AI transformation model 110 respectively tailored to different types of input medical images, wherein each particular version of the AI transformation model is configured to process input medical images of the same type. To this end, reference to medical images being the same "type" herein, refers to the particular modality, anatomical region depicted, dimensionality, acquisition parameters used, and any other suitable parameters that can categorically distinguish amongst medical images, being the same or similar.

In one or more embodiments, the preprocessing component 108 can perform one or more preprocessing operations on respective input medical images prior to processing of the input medical images by the AI transformation model 110. In some implementations, the one or more preprocessing operations can include a down sampling operation in which the input medical image is down sampled to reduce the resolution thereof. Other preprocessing suitable preprocessing operations may also be performed.

The AI transformation 110 corresponds to a medical image transformation model that has been trained (e.g., via training component 120) to transform respective input medical images (e.g., of a specific type) into transformed versions thereof using artificial intelligence. The particular type of transformation operation or operations performed by the AI transformation model 110 on the input medical images can vary and may vary depending on the type of the input medical images. However, in some embodiments, the transformation operations can be restricted to pixel or voxel intensity transformation operations defined by differential mathematical functions. In other words, the transformation operations can include any suitable transformation operation in the pixel or voxel intensity space that can be defined by a differentiable or monotonically increasing continuous transformation function. With these embodiments, the AI transformation model 110 transforms an input medical image into a transformed version thereof having a desired target appearance (e.g., an improvement in quality or another type of change in appearance) by processing all pixels or voxels of the input image and selectively adjusting (e.g., increasing or decreasing) the pixel or voxel intensity values of some or all of the pixels or voxels.

In various embodiments, the transformation operation(s) can include one or more medical image enhancement operations that enhance one or more visual appearance qualities of the input medical image. For example, in some implementations, the transformation operations can include a tissue equalization (TE) transformation operation that involves adjusting intensity values of respective pixels or voxels (or a portion thereof) of the input image in a manner such that the resulting output image (i.e., the transformed version of the input image) has smoothed or reconciled pixel or voxel intensity values across different tissue types. In another non-limiting example, the transformation operations can include a brightness-contrast (BC) transformation operation that involves altering (e.g., increasing or decreasing) the brightness level and/or contrast level of the input image as a function of adjusting intensity values of respective pixels or voxels (or a portion thereof) of the input image.

For example, FIG. 2 illustrates an example input medical image 202 and an example output medical image 204 generated by a version of the AI transformation model 110 configured to perform both a TE transformation operation and a BC transformation operation on XR images of the chest. In accordance with this example, the input to the AI transformation model 110 included the input medical image 202 and the output medical image 204 corresponds to the output of the AI transformation model 110. As shown in FIG. 2, the output medical image 204 corresponds to an enhanced version of the input medical image 202 with significantly improved visual appearance.

With reference back to FIG. 1, as yet another non-limiting example, the one or more transformation operations performed by the AI transformation model 110 can include a denoising operation, which can involve reducing an amount of visual or optical noise present in the input medical image. As still another non-limiting example, the one or more transformation operations can include a modality-modification transformation, which can involve generating a version of the input medical image whose visual characteristics are in accordance with a different imaging modality than that which was used to generate or capture the input medical image. Various other image transformation operations are envisioned.

The execution component 112 executes the AI transformation model 110 (and/or a portion thereof) on respective input medical images (e.g., the runtime data) to generate transformed versions of the respective input medical images. The training component 120 trains the AI transformation model 110 in accordance with a supervised machine learning training process (e.g., as described infra with reference to FIG. 9) to perform one or more desired transformation tasks on a particular type of input medical image. The rendering component 116 renders the transformed version or versions of an input medical image generated via the AI transformation model 110 via any suitable electronic display. For example, in various embodiments, the electronic display can be included in the one or more input/output device 126 associated with the computing system 100. Additionally, or alternatively, the electronic display may be located at a remote device to which the computing system 100 is communicatively and operatively connected (e.g., via one or more wired or wireless communication networks).

In some embodiments, the rendering component 116 can render the transformed version or versions of an input medical image via a medical imaging application 118 and a corresponding graphical user interface (GUI) of the medical imaging application 118. For example, the medical imaging application 118 can include or correspond to a software application, program, or the like, that provides for viewing medical images, and performing various actions or tasks involving the medical images, such as but not limited to, editing the medical images, annotating the medical images, executing image processing workflows on the medial images (e.g., including workflows involving the AI transformation model 110 and others) and reviewing the results, generating radiology reports, and the like. For example, the medical imaging application 118 may be used by radiologists and other medical professionals to review medical images in association with providing a clinical interpretation. The medical imaging application 118 may also be used by other entities, such as engineers, technicians, model developers and the like, to facilitate editing and annotating medical images in association with developing medical image inferencing models or the like.

In some embodiments, the medical imaging application 118 can integrate with the AI transformation model 110 and the execution component 112 and provide tools for controlling execution of the AI transformation model 110 on input medical images, viewing the results, and editing the results in real-time. For example, the medical imaging application 118 can include an image transformation tool that enables a user to select and apply (e.g., via execution component 112) an AI transformation model 110 to a selected input medical image and review the transformed version via the GUI. The medical imaging application 118 can also include an editing tool that enables the user to edit the appearance of the transformed version via the GUI and view the results of editing operations in real-time, as controlled by the user. For example, as applied to output medical image 204, the medical imaging application 118 can render the output medical image 204 via the GUI and the editing tool can allow the user to provide input indicating a desired adjustment to the visual appearance of the output image, such as changing the brightness level and/or contrast level and changing the tissue equalization characteristics. The disclosed techniques enable the editing operations indicated by the user to be applied in real-time such that the user can view updated versions of the output medical image 204 in real-time in response to reception of user input adjusting the visual property settings via the editing tool. In this context, real-time refers to generating and rendering an updated version of the output medical image (e.g., output medical image 204 and the like) within less than about 1.0 second in some implementations, and even on the order of about 10 milliseconds in some implementations, after reception of the user input via the editing tool. To this end, the disclosed techniques enable the user to repeatedly provide input via the editing tool adjusting the visual properties and view the results of the corresponding editing operations applied in real-time (e.g., viewing how the rendered image changes in real-time as the user adjusts a brightness slider button or the like). As described in greater detail below, the editing operations are performed by the AI transformation model 110 itself (as opposed to separate image processing/editing functions) in association with reprocessing the input medical image via a portion (e.g., the transformation module 208 portion) of the AI transformation model 110 to generate an updated transformed version of the input medical image. In this regard, the AI transformation model 110 comprises an editable output image appearance control functionality that enables the user to control (e.g., via the editing tool) the transformation operations performed by the transformation function or functions employed by the AI transformation model 110 on the medical image to achieve a desired output image appearance in association with viewing changes to the output image appearance in real-time.

It should be appreciated that the architecture of computing system 100 can vary. For example, in some implementations, computing system 100 can correspond to a single computing device, which can include any suitable type of computing device (e.g., a desktop computer, a laptop computer, a mobile computing device, a mobile graphics processing unit device, a smartphone, a server device, a cloud computing device, etc.). In other implementations, computing system 100 can correspond to a distributed computing system comprising a plurality of disparate computing devices communicatively and operatively connected to one another via any suitable wired or wireless communication network. With these embodiments, components of computing system 100 can be located and executed by disparate devices. For instance, the medical imaging application 118 may include or correspond to a web application hosted by a remote server that integrates with the computing system 100 and provides access to and usage of the AI transformation model 110 as a software-as-a-service (SAS) or the like using any authorized and compatible user computing device (e.g., a personal computer, a smartphone, a laptop, a desktop computer, etc.). To this end, various architectural configurations are envisioned.

Additional details regarding the features and functionalities of computing system 100 and the associated components are described in greater detail below with reference to FIGS. 3-9.

Figure 3:
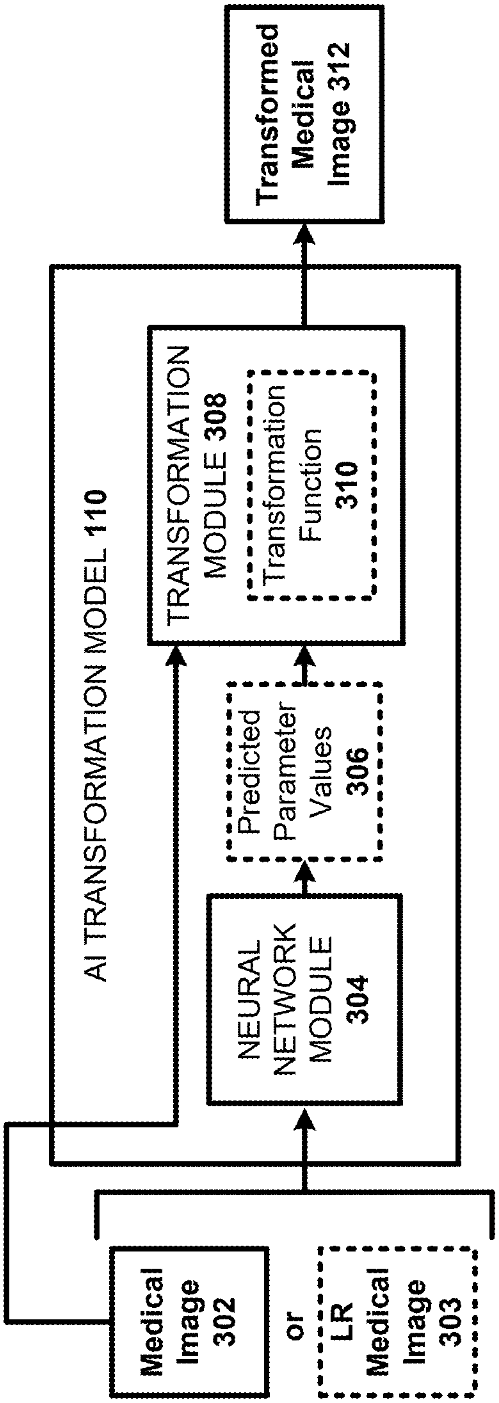
FIG. 3 presents an example AI transformation model in accordance with one or more embodiments of the disclosed subject matter.

FIG. 3 presents a closer view of the AI transformation model 110 in accordance with one or more embodiments of the disclosed subject matter. With reference to FIGS. 1-3, as shown in FIG. 3, the AI transformation model 110 can include a neural network module 304 and a transformation module 308. The neural network module 304 comprises a neural network that predicts values of parameters (e.g., predicted parameter values 306) of a transformation function based on processing an input medical image 302 or a down sampled version of the medical image (e.g., LR medical image 303) via the neural network. The transformation module 308 then generates the transformation function (e.g., transformation function 310) using the predicted parameter values 306 values and applies the transformation function 310 to the medical image 302, resulting in generation of the transformed version of the medical image 312.

In this regard, the input to the AI transformation model 110 can include a medical image 302 (e.g., corresponding to the input medical image, such as input medical image 202 for instance) or a combination of the medical image 302 and a low resolution (LR) version of the medical image 302 (e.g., LR medical image 303), and the output of the AI transformation model 110 include a transformed medical image 312 (e.g., corresponding to the output medical image, that is, a transformed version of medical image 302, such as output medical image 204 for instance). For example, in various embodiments, medical image 302 can correspond to a high resolution (HR) medical image, such as an XR image, a CT image, an MR image, or the like, having a resolution considered high (e.g., as defined relative to one or more threshold resolutions). For instance, as applied to medical image 302 being an XR image, the resolution of medical image 302 as generated via the XR imaging system may be defined by an x-y array of pixels of about 1000×1000 pixels or greater.

In some embodiments in which the original input image (e.g., medical image 302) has a high resolution (e.g., as predefined relative to a defined threshold), the preprocessing component 108 can down sample the medical image 302 to generate a LR version of the medical image 302, that is illustrated in FIG. 3 as LR medical image 303. For instance, assuming medical image 302 corresponds to an XR image with a pixel array of about 1000×1000 pixels or greater, the LR medical image 303 may be reduced to a size of about 256×256 pixels, or by another defined pixel reduction amount. With these embodiments, the LR medical image 303 is supplied as input to the neural network module 304 as opposed to the (HR) medical image 302. In other embodiments, the medical image 302 (e.g., a HR image) can be supplied as input to the neural network module 304 and the generation of the LR medical image 203 can be excluded. However, in both of these embodiments, the medical image 302 is separately supplied as input to the transformation module 308. In other words, in some embodiments, the LR medical image 303 can be supplied as input to the neural network module 304 and the medical image 302 can be separately supplied as input to the transformation module 308, while in other embodiments, the medical image 302 can be separately supplied as input to the neural network module 304 and the transformation module 308.

In this regard, downsampling an image refers to the process of reducing the size or resolution of the image by decreasing the number of pixels it contains. This reduction in resolution can be achieved by the preprocessing component 108 through any suitable technique, such as but not limited to, subsampling, average pooling, max pooling, Gaussian blur and subsampling, and/or pyramid representation. In various embodiments, the neural network module 304 can be configured to process the LR medical image 303 as opposed to the medical image 302 (having the higher resolution) to simplify the image processing operations performed by the neural network module 304. More particularly, this simplification equates to a significant reduction in computational resources used by the neural network module 304 and a significant reduction in processing time, as discussed in greater detail with reference to FIG. 5 and a more detailed discussion of the neural network module 304.

Generally, the neural network module 304 includes or corresponds to a neural network that predicts values of parameters (e.g., predicted parameter values 306) of a predetermined transformation function to be applied to the medical image 302, wherein the neural network module 304 generates the predicted parameter values 306 based on processing the medical image 302 or the LR medical image 303 (i.e., a down sampled version of the medical image 302) via the neural network. The transformation module 308 then generates (or constructs, configures, etc.) the transformation function 310 using the predicted parameter values 306 and using a predefined mathematical formulation of the transformation function 310, as provided in model configuration data 114 or otherwise integrated within the transformation module 308. The transformation module 308 further applies the (generated or configured) transformation function 310 to the medical image 302, resulting in generation of the transformed version of the medical image, that is transformed medical image 312.

To this end, the LR medical image 203, the predicted parameter values 306 and the transformation function 310 are illustrated in FIG. 3 with dashed boxes to indicate the respective data objects or data structures correspond to data that is generated by computing system 100 (e.g., via preprocessing component 108, neural network module 304 and transformation module 308, respectively) in association with execution of the AI transformation model 110 on a medical image 302. As shown in FIG. 3, the AI transformation model 110 includes a transformation function 310 that corresponds to a generated or configured version of a predefined transformation function (e.g., as predefined in model configuration data 114 or otherwise integrated within the transformation module 308). Said differently, the AI transformation model 110 can include a predefined transformation function, wherein the predefined transformation function merely defines the mathematical relationships between the parameters whose values are predicted by the neural network module 304, and a target appearance for the transformed medical image 312. To this end, each time the AI transformation model 110 processes a medical image 302, the neural network module 304 predicts parameter values 306 of the predefined transformation function tailored to that medical image 302, and the transformation module 308 generates (e.g., configures the predefined transformation function) a tailored version of the predefined transformation function (e.g., transformation function 310) for that medical image using the predicted parameter values 306 and in accordance with the mathematical equation that defines the predefined transformation function. The transformation module 308 then applies the (generated) transformation function 310 to the medical image 302, resulting in transformation of the medical image into the transformed medical image 312.

The particular parameters for which the predicted parameter values 306 are determined by the neural network module 304 correspond to known or predefined control parameters of the predefined transformation function that control the appearance of the transformed medical image 312. In various embodiments, the predefined transformation function can include any differential transformation function (or combination thereof) in the pixel or voxel intensity space that involves mapping input pixel intensity values of respective pixels of the medical image 302 to output pixel intensity values of respective pixels of the transformed medical image 312 to achieve a desired transformation between the appearance of the medical image 302 and the appearance of the transformed medical image 312. For example, the predefined transformation function can include a TE transformation function, a BC transformation function, a combination of a TE transformation function and a BC transformation function, or another type of transformation function. In this regard, reference to a "transformation function" herein assumes that the transformation function can include one or more transformation functions, unless otherwise stated.

In this regard, the predefined transformation function can include or correspond to one or more differential functions defined by known mathematical equations for creating a mapping between input pixel intensity values of respective pixels of the input image (e.g., medical image 302) and output pixel intensity values of respective pixels of the output image (e.g., the transformed medical image 312) to achieve a desired look, given the input pixel intensity values of respective pixels of the medical image 302, the spatial locations of the respective pixels, and the predicted parameter values 306 of known or predefined control parameters of the predefined transformation function that control the mapping. For example, in some implementations as applied to an example TE transformation function, the predefined control parameters can include a regional contrast parameter (denoted herein as variable a), a regional brightness parameter (denoted herein as variable b), and a thin and thick region intensity threshold parameter (denoted herein as m). In another example implementation, as applied to an example BC transformation function, the predefined control parameters can include a window width parameter (denoted herein as variable c) and a window level parameter (denoted herein as variable w).

Thus, in various embodiments, the input to the neural network module 304 comprises a medical image (e.g., medical image 302 or LR medical image 303) and the output includes predicted parameter values 306 of respective parameters of the transformation function (or functions) to be applied to the medical image 302 that control how to transform the appearance of the medical image. For instance, as an oversimplified example, assume the transformation function corresponds to a simple brightness transformation function controlled by a single brightness parameter B that operates on the whole image. In accordance with this example, the predicted parameter values would include a predicted value for B. However, in association with predicting the value for B, the neural network module may consider the entire image content and the positions of the input pixels to determine the most important locations in the image and setting the brightness control parameter B in a way that those most important locations have optimal brightness levels, as controlled via the mathematical definition of the brightness transformation function. In other words, the neural network module 304 evaluates the input image pixels in the physical domain to extract information (e.g., predicted parameter values 306) regarding how to adjust the image in the intensity domain and then generates the transformation function accordingly in the intensity domain. The predicted parameter values 306 are thus valid for the whole image. The constructed transformation function is then applied to the whole image (e.g., medical image 302) to transform the pixels in the intensity domain back to the physical domain on a per pixel level. All these steps are differentiable for AI learning.

To this end, the mathematical definition (e.g., a defined mathematical equation) of the transformation function 310, can be included in the model configuration data 114, and once the predicted parameter values 306 have been generated, the transformation module 308 can generate, construct or otherwise configure the transformation function 310 in accordance with the mathematical definition and the predicted parameter values 306 for the corresponding control parameters. In various embodiments, because the transformation function 310 corresponds to a mapping between input and output pixel intensity values, the transformation function 310 can correspond to a look-up table (LUT) and/or graphically represented as a graphical look-up curve (LUC), as illustrated in FIGS. 4A and 4B.

Figure 4A:
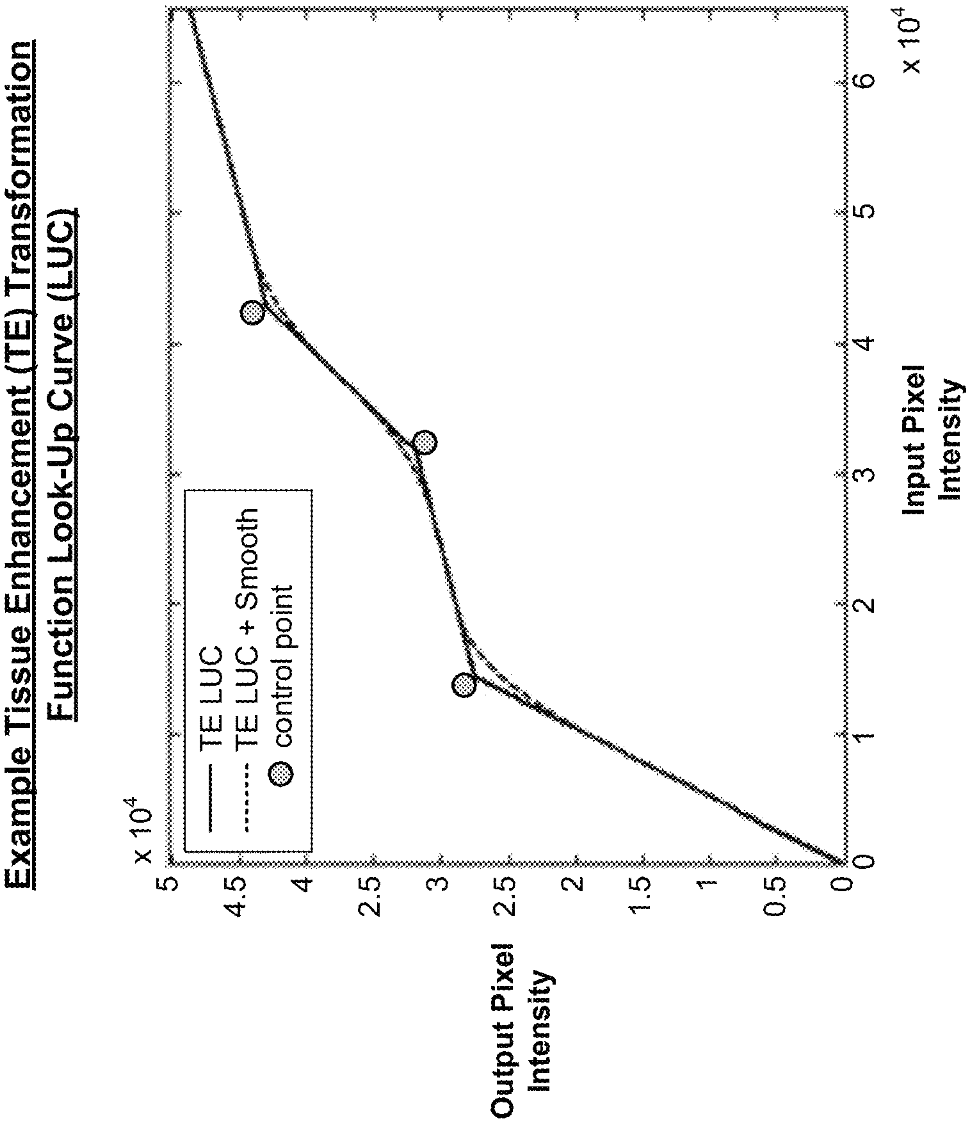
FIG. 4A presents an example tissue enhancement (TE) transformation function look-up curve (LUC), in accordance with one or more embodiments of the disclosed subject matter.
Figure 4B:
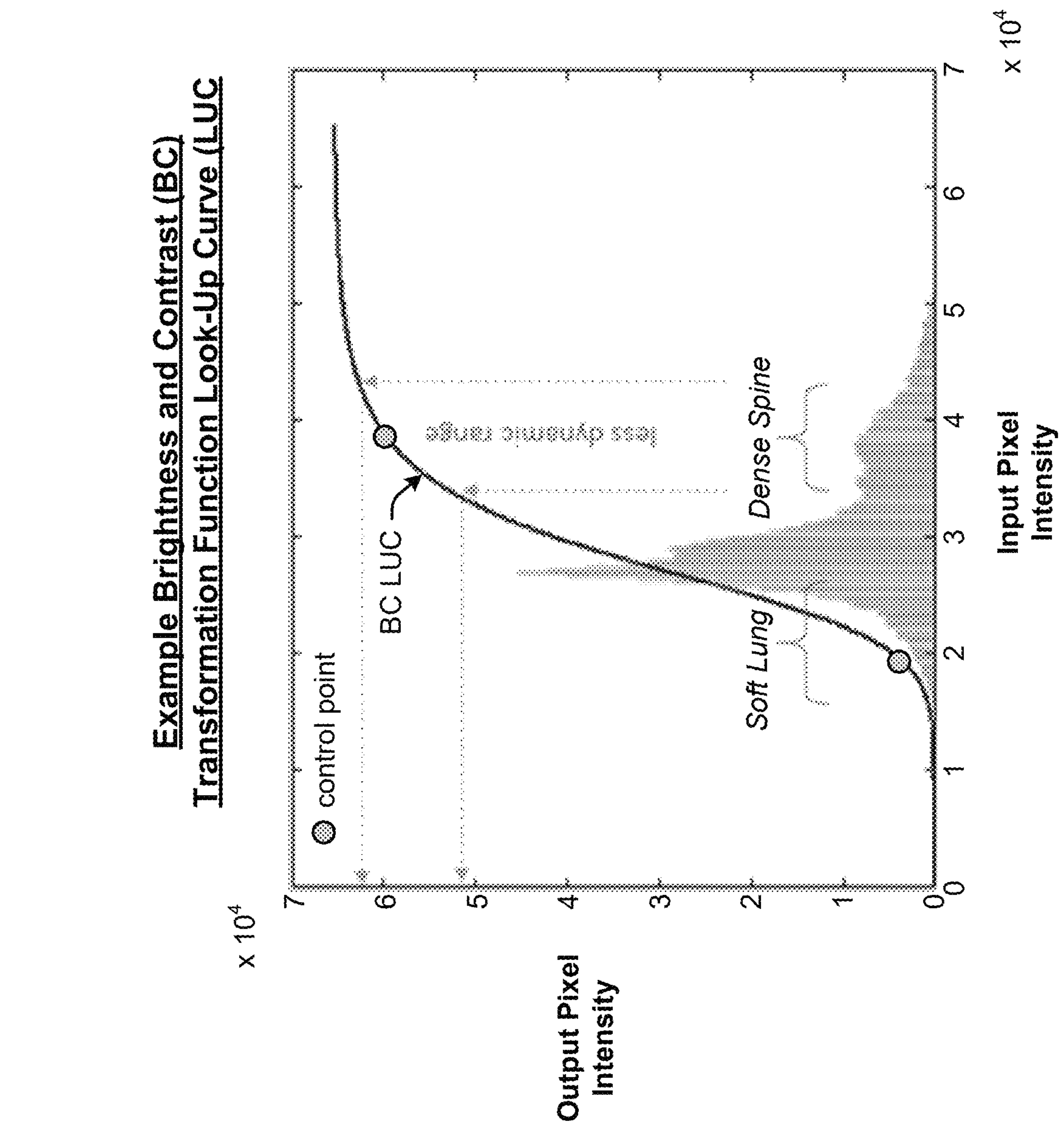
FIG. 4B presents an example brightness and contrast (BC) transformation function LUC, in accordance with one or more embodiments of the disclosed subject matter.

With reference to FIGS. 4A and 4B in view of FIGS. 1-3, FIG. 4A presents an example tissue enhancement (TE) transformation function look-up curve (LUC), in accordance with one or more embodiments of the disclosed subject matter. FIG. 4B presents an example brightness and contrast (BC) transformation function LUC, in accordance with one or more embodiments of the disclosed subject matter. As shown in FIGS. 4A and 4B, for both the TE transformation function and the BC transformation function, the input variable includes the input pixel intensity (denoted as pixel intensity values x and plotted with respect to the x-axis), while the output of the respective transformation functions is the new value or output pixel intensity value (denoted as pixel intensity values y and along plotted with respect to the y-axis). To this end, in association with applying the configured/constructed transformation function 310 to the medical image 302, the transformation module transforms the intensity values of each pixel of the medical image in accordance with the LUCs. The mathematical definition of the transformation function defines a mapping between the input pixel intensity and the output pixel intensity as a function of defined control parameters (e.g., control parameters a, b, m as applied to the TE transformation function illustrated in FIG. 4A, and control parameters c and w as applied to the BC transformation function illustrated in FIG. 4B), wherein the predicted values of the control parameters account for the whole image.

In other words, as illustrated in FIGS. 4A and 4B, the transformation function 310 generated by the transformation module 308 corresponds to mapping information defining a mapping between the input pixel intensity value and the output pixel intensity value that can be graphically represented as a graphical LUC. Thus, application of the transformation function 310 to the medical image 302 corresponds to applying the mapping information or otherwise using the mapping information to change the intensity values of each pixel of the medical image 302 from its x variable value to the corresponding y variable value. In other words, the transformation module 308 can adjust the pixel intensities of the medical image 302 in accordance with the mapping information provided by the transformation function 310 to transform the medical image 302 into the transformed medical image 312, which may include increasing or decreasing the intensity value of some or all pixels and leaving the original intensity value of one or more pixels, depending on the input pixel intensity value and the shape of the LUC.

In accordance with the example shown in FIG. 4A, the TE function is a piece-wise monotonically increasing function. Therefore, it can be decomposed into several small pieces in accordance with TE transformation function Equation 1 below, with control parameters a and b, which are slop and bias of the linear functions, while at the same time, the boundary parameter m controls piece functions edges. In accordance with this example implementation of the TE function, a and b control the regional contrast and brightness, while m controls the definition of thin and thick regions.

$$y = f(x, a1, b1), \text{ for } 0 < x < m1$$
$$y = f(x, a2, b2), \text{ for } m1 < x < m2$$
$$y = f(x, a3, b3), \text{ for } m2 < x < m3$$
$$y = f(x, a4, b4), \text{ for } m3 < x < 1 \text{ (max intensity).}$$

TE transformation function, Equation 1

As represented as a graphically in accordance with Equation 1, as shown in FIG. 5A, the TE transformation function corresponds to a LUC with three control points. The control points respectively correspond to the control parameters a, b and m, wherein varying the control points changes the shape of the LUC and thus changes the resulting appearance of the transformed medical image 312.

Additionally, or alternatively, the transformation module 308 can employ a TE transformation function defined in accordance with Equation 2 below.

$$\text{Curve} = k_0 + \sum_{n=0}^{N-1} (k_{n+1} - k_n) F(I; n; a_n),$$
$$\text{where } F(I; n; a_n) = F_c^2(F_\sigma(I \times N - n \times b); a_n),$$
$$\text{where } F_c^j(x, a) = (F_c^{j-1} + a \times F_c^{j-1}).$$

TE transformation function, Equation 2.

In accordance with Equation 2, the Curve corresponds to the y variables. The learnable parameters are k, a, and b, while N is the number of control points based on the preferred number of intervals, and $F_\sigma$ is Hardtanh(0, 1), $x \in [0, 1]$ after intensity normalization. In this example, the TE LUC has 5 different control points. The parameter k controls the point height, parameter a controls curve slop and parameter b controls the vertical location of the point.

Additionally, or alternatively, the transformation module 308 can employ a TE transformation function defined in accordance with Equation 3 below:

$$\text{Curve} = k_0 + \sum_{n=0}^{N-1} (k_{n+1} - k_n) F(I; m_{n+1}; m_n),$$
$$\text{where } F(I; m_{n+1}; m_n) = F_\sigma\left(\frac{I - m_n}{m_{n+1} - m_n}\right).$$

TE transformation function, Equation 3.

In accordance with Equation 3, the Curve corresponds to the y variables and $F_\sigma$ is Hardtanh(0, 1), $x \in [0, 1]$ after intensity normalization. At the same time, parameter m should be monotonically increasing. Therefore, the m is implemented by m=cumulative sum (interval), while $\Sigma$ interval=1. The interval is the distance between points in intensity space. In this example, the learnable parameters are k, and m, while N is the number of control points based on the preferred number of intervals. In this example, the TE LUC has 5 different control points. The parameter k controls the point height, and parameter m controls the vertical location of the point.

In accordance with the example shown in FIG. 5B, the BC transformation function is also defined as a monotonically increasing function. In this example, the BC transformation function is a sigmoid-like function controlled by global brightness c and contrast w, in accordance with BC transformation function Equation 4 below, wherein $x \in [0, 1]$ after intensity normalization.

$$y = \left(\frac{1}{1 + \exp\left(-4\frac{x - c}{w}\right)}\right).$$

BC transformation function, Equation 4

In this regard, because the TE and BC transformation functions are respectively defined as monotonically increasing continuous functions, they are respectively differential during neural network training, and therefore can be learned automatically in association with training the neural network employed by the neural network module 304. In other words, by using differentiable transformation functions to control the image transformation, the neural network employed by the neural network module 304 can learn to accurately predict the values of the control parameters (e.g., a, b, m, c, w, etc.) for a given input image based on training the AI transformation model 110 using ground-truth exemplars for the y variables, that is the target pixel intensity values per pixel. More importantly, this learning procedure pushes the neural network to learn the human tuning behavior, and is therefore interpretable. This training process is described infra with reference to FIG. 9.

To this end, as opposed to training a complex neural network model to directly predict how to transform the input medical image pixel intensity values into the output intensity values and perform the transformation, the disclosed techniques train the neural network employed by the neural network module 304 to predict the values (e.g., predicted parameter values 306) of the known control parameters of the transformation function 310, wherein the predicted values are learned (e.g., via the training process) to result in mapping the input pixel intensity values for the given input image to the correct output intensity pixel values (to achieve a desired transformed image appearance) in accordance with the mathematical definition of the transformation function 310. The transformation module 308 then generates (e.g., configures, computes, or the like) the transformation function 310 using the predicted parameter values, and applies the transformation function 310 to the medical image 302 to generate the transformed medical image 312 given the input pixel intensities for each pixel.

It should be appreciated that Equations 1-4 above are merely examples of transformation function equations for performing TE and BC transformations respectively. In this regard, the mathematical definitions of the TE and BC transformation functions employed by the transformation module 308 (and other types of differential transformation functions that may be employed by the transformation module 308) can vary and are not restricted to Equations 1-4 above.

In one or more alternative embodiments, the neural network module 304 can predict separate control parameter values for each pixel of the medical image 302 or the LR medical image 303. In other words, the predicted parameter values 306 can comprise per pixel values of the parameters for each pixel of the respective pixels of the medical image 302 or the LR medical image 303. With these embodiments, as opposed to generating a transformation function applicable to the medical image 302 as whole, the transformation module 308 can generate separate transformation functions for each pixel. In other words, the transformation module can generate separate LUCs for each pixel of the medical image 302. With these embodiments, in association with transforming the medical image 302, the transformation module 308 can apply the corresponding LUC for each pixel to change its intensity value accordingly (or not in implementations in which the LUC mapping between the x and y value for that pixel is the same).

Figure 5:
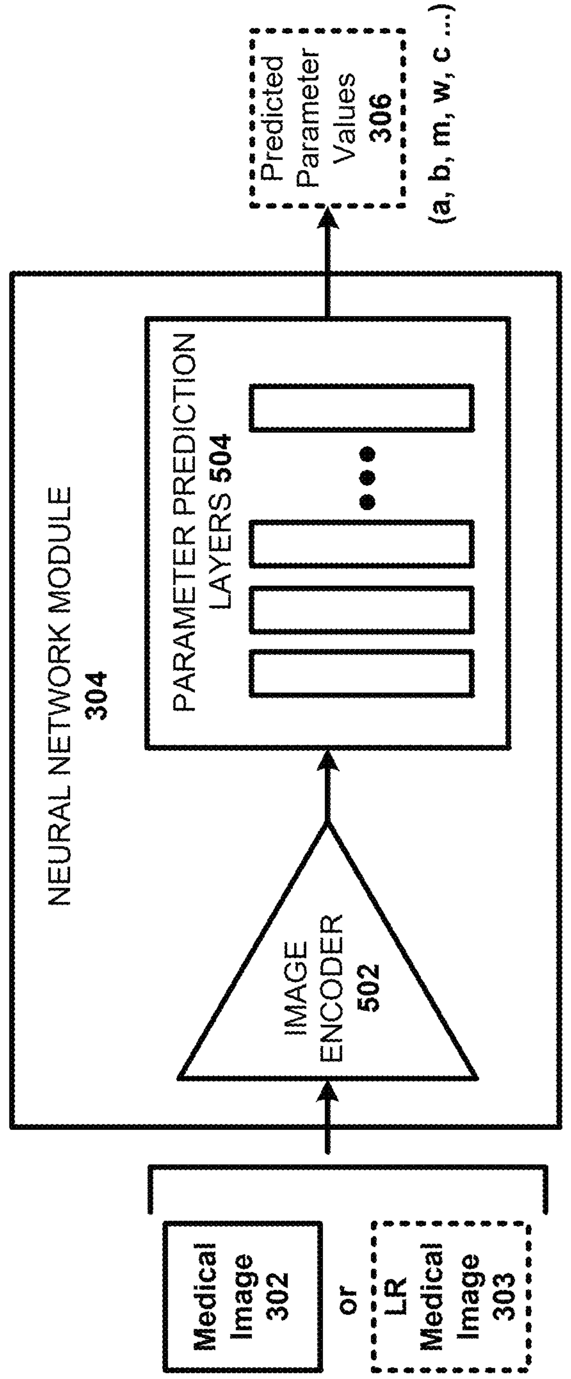
FIG. 5 presents an example neural network module of the AI transformation model, in accordance with one or more embodiments of the disclosed subject matter.

FIG. 5 presents a closer view of the neural network module 304 of the AI transformation model, in accordance with one or more embodiments of the disclosed subject matter. With reference to FIGS. 1-5, as shown in FIG. 5, the neural network module 304 can include an image encoder 502 and parameter prediction layers 504. The image encoder 502 and the parameter prediction layers 504 can respectively correspond to neural networks. In this regard, the combination of the image encoder 502 and the prediction layer 504 can correspond to an aggregate neural network employed by the neural network module 304 to generate the predicted parameter values 306 based on processing the medical image 302 or the LR medical image 303 (i.e., a down sampled version of the medical image 302).

The image encoder 502 corresponds to a type of neural network that extracts a meaningful representation (also known as features or embeddings) from the input medical image. The extracted representation (e.g., extracted features or feature embeddings) capture various characteristics of the input medical image, such as shapes, textures, and high-level semantic information. In various embodiments, the image encoder 502 comprises a convolutional neural network (CNN). CNNs are well-suited for image processing tasks due to their ability to capture spatial hierarchies of features from raw pixel data. The convolutional layers in the network apply a series of filters to the input medical image, extract low-level features such as edges and textures in the early layers and higher-level features such as object parts and structures in the deeper layers.

Figure 9:
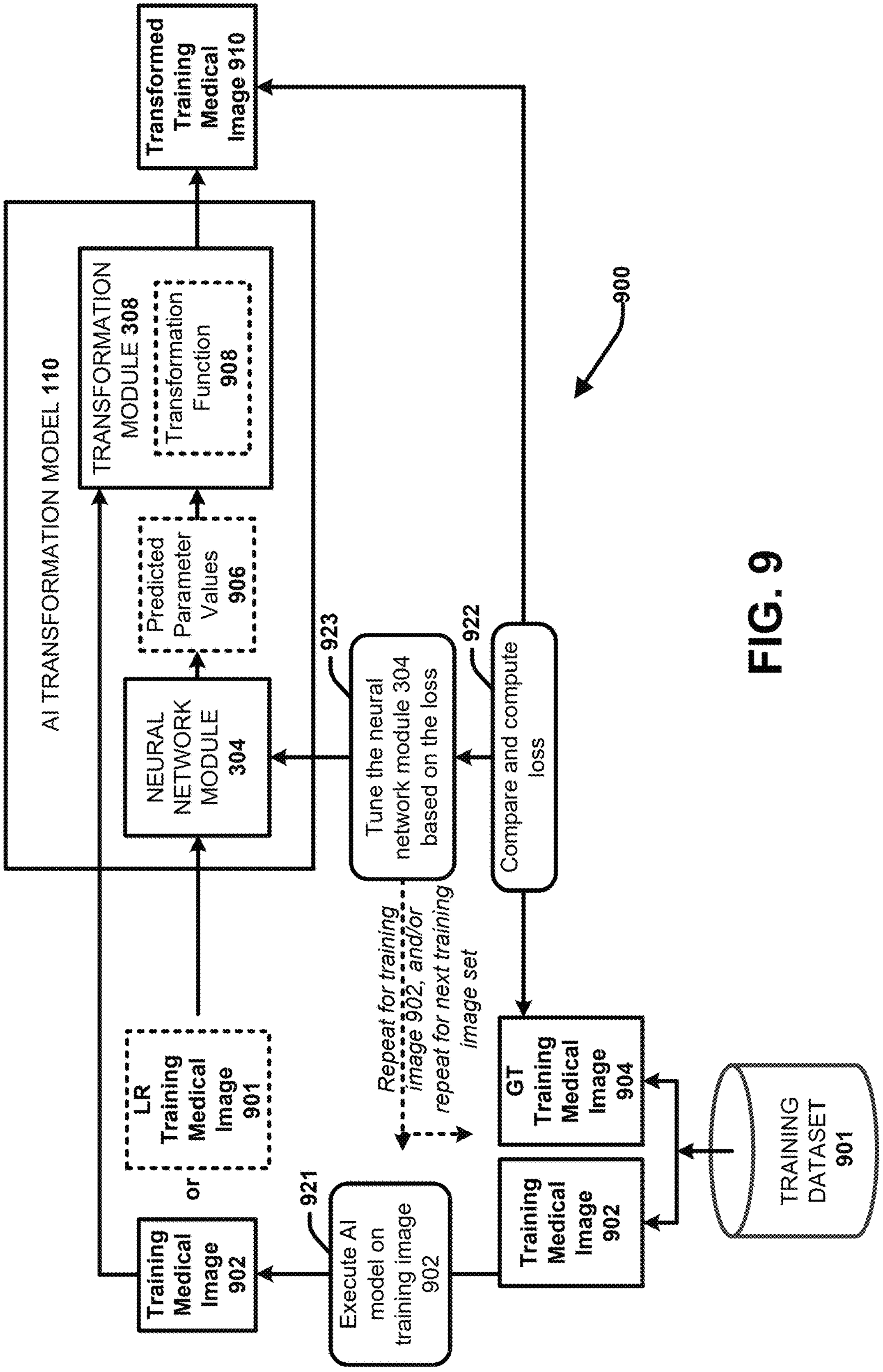
FIG. 9 illustrates an example training process for training the AI transformation model, in accordance with one or more embodiments of the disclosed subject matter.

In some embodiments, the CNN of the image encoder 502 can correspond to a CNN without any pre-training prior to training by the training component 120 in accordance with the training process described in FIG. 9 for a particular type of input medical image and image transformation task (e.g., TE, BC, TE and BC, or another transformation task). With these embodiments, during training, the parameters or filters of the CNN are jointly optimized with the parameters of the parameter prediction layers 504. In some implementations of these embodiments, the CNN can correspond to a simple CNN. In this context, the term "simple" refers to the number of parameters included in the CNN being relatively low compared to more complex CNNs, such as less than 100 thousand parameters. For example, in some implementations, the CNN of the image encoder 502 can have about 60 thousand parameters or less. In comparison, more complex image encoders typically have millions of parameters. For example, an image encoder corresponding to a pretrained foundation model, such as the segment anything model (SAM™) encoder or the like, has more than 91 million parameters.

By using a simple CNN as the image encoder 502 as opposed to a more complex CNN with millions of parameters, the computational resources in terms of amount of memory storage used to store the CNN and processing power and duration (e.g., time) required to run the model to generate the corresponding output data is significantly reduced in comparison to that required for storing and running a more complex encoder with significantly more parameters. In addition, by feeding the CNN the LR medical image 303 as opposed to the high resolution medical image 302, the processing power and duration required to run the model to generate the corresponding output data is also significantly reduced (as compared to the amount of processing power and duration required to run the model and generate the corresponding output data in association with processing the high resolution medical image 302).

In other embodiments, the CNN of the image encoder 502 can comprise a pretrained CNN, such as a pre-trained foundation model image encoder (e.g., SAM or a similar pretrained image encoder). With these embodiments, the pretrained CNN image encoder can be frozen during training to make use of general features extracted by the pretrained CNN, thereby reducing the duration of processing time involved in training the AI transformation model 110. In this context, freezing the CNN during training refers to blocking or preventing tuning of all parameters (e.g., filters, weights, connections, activation layers, etc.) of the pretrained CNN during training. In other words, during training of the AI transformation model 110 using a pretrained CNN as the image encoder 502, only the parameters of the feature prediction layers 504 are tuned.

The extracted features or feature embeddings output by the image encoder 502 are fed as input to the parameter prediction layers 504. The parameter prediction layers 504 comprise a plurality of regression layers (i.e., neural network layers) that have been configured (e.g., tuned during training) to predict the values (e.g., predicted parameter values 306) of the required control parameters of the transformation function employed by the transformation module 308 based on the extracted feature or feature embeddings output by the image encoder 502. In this regard, the output of the parameter prediction layers 504 comprises the predicted parameter values.

Because the neural network architecture employed by the neural network module 304 does not employ an encoder-decoder neural network architecture, as it only employs an CNN based image encoder 502 combined with parameter prediction layers 504 which are simply regression layers, the neural network architecture of the neural network module 304 does not perform any down sampling or up-sampling operations on the input medical image 302 in association with transforming the input medical image 302 into the transformed medical image 312. On the contrary, the neural network module 304 only processes the input medical image 302 or the LR medical image 304 to predict the values of the parameters needed to generate the transformation function 310 to be applied to the input medical image 302. As a result, the resulting transformed medical image 312 is free of spatial artifacts. This feature of the disclosed techniques is significant, as alternative AI solutions that employ neural network models configured to directly output a transformed version of the input medical image require performance of down sampling and up-sampling operations on the input medical image, which often results in generation of artifacts (e.g., blurring, distortions, and other types of visual artifacts) in the transformed version of the medical image. In this regard, all transformed versions of input medical images generated by the trained version of the AI transformation model 110, regardless of the type of transformation function employed, entirely exclude spatial artifacts as a result of the neural network architecture of the neural network module 304 comprising only a CNN combined with regression layers.

Figure 6:
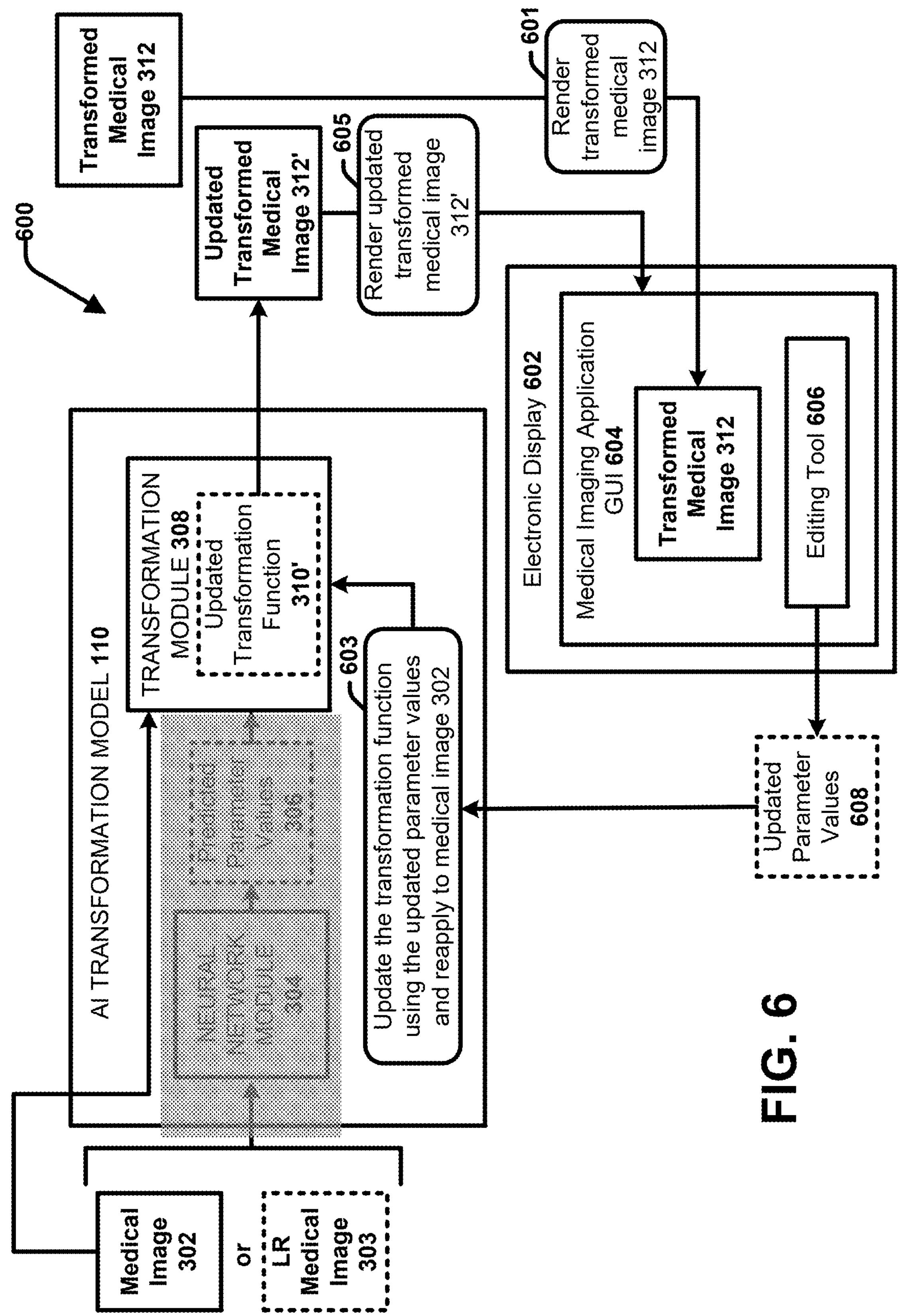
FIG. 6 illustrates an example process for viewing and editing output images generated by the AI transformation model, in accordance with one or more embodiments of the disclosed subject matter.

FIG. 6 illustrates an example process 600 for reviewing and editing output medical images generated by the AI transformation model 110, in accordance with one or more embodiments of the disclosed subject matter. With reference to FIGS. 1-6, process 600 corresponds to an example process performed by the computing system 100 after execution of the AI transformation model 110 on the input medical image 302 (or the input medical image 302 and the LR medical image 303) to generate the initial, transformed medical image 312. In this regard, process 600 begins after the initial or first transformed medical image 312 has been generated in accordance with the processing operations of the neural network module 304 and the transformation module 308 described with reference to FIG. 3. To this end, the transformed medical image 312 generated by the AI transformation model 110 corresponds to the default, transformed version of the medical image 302 that the AI transformation model 110 has been trained to generate.

After the AI transformation model 110 has generated the initial or first transformed medical image 312 in accordance with the operations described with reference to FIG. 3, the execution component 112 can re-execute the AI transformation model 110 on the medical image 302 any number of additional times (e.g., as desired based on user input prompting re-execution thereof in association with applying editing operations to the displayed transformed version of the medical image 302, as described below) to generate corresponding updated transformed versions of the medical image 302. In this regard, the updated transformed versions respectively correspond to different versions of the transformed medical image 312 that have been revised or edited by a user to have a tailored visual appearance based on the user's preferences.

Importantly, the re-execution of the AI transformation model 110 on the original, input medical image 302 after generation of the initial, (default) transformed medical image 312 does not involve re-execution of the neural network module 304 to generate the predicted parameter values 306. On the contrary, each time the AI transformation model 110 is re-executed by the execution component 112 to generate an updated, transformed version of the medical image 302, the execution component 112 only re-executes the transformation module 308 and deactivates or freezes the neural network module 304. This deactivation or freezing of the neural network module 304 operations of the AI transformation model 110 in association process 600 is indicated via the grey shading overlaid onto the corresponding elements shown in FIG. 6. Because the processing operations performed by the neural network module 304 are excluded in association with generating updated transformed versions of the medical image 302 and only the operations performed by the transformation module 308 are involved, the updated transformed versions can be generated by the transformation module 308 in real-time (e.g., under 1 second for each new transformed version, and even at about a processing time of about 10 milliseconds).

In this regard, process 600 begins at 601, wherein the rendering component 116 renders the transformed medical image 312 (e.g., the default or initial transformed version of medical image 302 generated via full processing operations of the neural network module 304 and the transformation module 308) via an electronic display 602. For example, the electronic display 602 can correspond to a display device of computing system 100 (e.g., included in the input/output devices 126). As shown in FIG. 6, in various embodiments, the rendering component 116 can render the transformed medical image 302 in response to generation thereof via the medical imaging application 118 and a corresponding GUI 604 of the medical imaging application 118.

The medical imaging application 118 can further include an editing tool 606 that facilitates receiving user input indicating an adjustment to one or more values (e.g., one or more of the predicted parameter values 306) of one or more control parameters of the transformation function 310 that control the appearance of the transformed medical image 312. For example, the editing tool can allow the user to provide input identifying or indicating a desired change to the visual appearance of the displayed transformed medical image 312, wherein the desired change corresponds to a change to one or more values of the control parameters. To this end, the editing tool 606 can control the types of visual adjustments or editing operations that can be applied to the transformed medical image 312 as a function of the control parameters of the transformation function that define and control the appearance of the transformed version of the medical image 302. For example, as applied to a BC transformation function, the editing tool 606 can provide a mechanism for adjusting the brightness level of the transformed version in association with receiving user input indicating an adjustment to a value of a control parameter of the BC transformation function that controls the brightness level. The editing tool 606 can also provide a mechanism for adjusting the contrast level of the transformed version in association with receiving user input indicating an adjustment to a value of another control parameter of the BC transformation function that controls the contrast level. Similarly, as applied to a TE transformation function, the editing tool 606 can provide mechanisms for adjusting various visual characteristics of the tissue enhancement aspects of the transformed version in association with receiving user input indicating an adjustment to one or more values of one or more control parameters of the TE transformation function that control the visual characteristics of the tissue enhancement aspects.

The mechanism via which the editing tool 606 facilitates receiving user input indicating an adjustment to one or more of the control parameter values of the transformation function 310 that control an appearance of the transformed version or versions of the medical image 302 can vary. For example, in some implementations, the editing tool 606 can display the current values of the control parameters of the transformation function 310 and enable the user to edit the current values as displayed. In other implementations, the editing tool 606 can display an interactive representation of the control parameters and their current values, wherein the interactive representation enables the user to provide input adjusting the control parameters in manner that correlates to an adjustment to their current values.

For example, in some embodiments, the editing tool 606 can render an interactive graphical LUC corresponding to the current configuration of the transformation function, such as the graphical LUC for the TE transformation function shown in FIG. 4A and/or the graphical LUC corresponding to the BC transformation function shown in FIG. 4B (depending on whether either or both transformation functions are used). With these embodiments, the version of the LUC rendered via the editing tool 606 can have an interactive functionality that enables the user to provide input adjusting the positions of one or more of the control points of the LUC. As described above, the positions of the control points correspond to the respective values of different control parameters of the corresponding transformation function. In this regard, based on reception of user input adjusting the position of one or more of the control points, the editing tool can 606 correlate the adjusted positions to updated parameter values 608 for the corresponding control parameters and provides the updated parameter values 608 to the transformation module 308.

In another example, the editing tool 606 can render interactive sliders (e.g., graphical control widgets, graphical buttons, or the like) corresponding to the control parameters of the transformation function. With these embodiments, adjustment of an interactive slider, such as moving the position of the slider button up and down, can correspond to providing input increasing or decreasing the value of the corresponding control parameter.

Additional examples of the editing tool 606 and the GUI 604 are presented in FIGS. 7A, 7B and 8 and described in greater detail below.

To this end, regardless of the mechanism via the editing tool 606 facilitates receiving the user input, the editing tool 606 can receive or otherwise determine based on the user input, updated parameter values 608 corresponding to the adjustment indicated via the user input, wherein the updated parameter values 608 correspond to one or more updated values for one or more of the control parameters of the transformation function that control the appearance of the transformed version of the medical image 302. The editing tool 606 further provides the updated parameter values 608 to the transformation module 308, which in turn, at 603, updates the transformation function using the update parameter values, resulting in updated transformation function 310', and applies the updated transformation function 310' to the medical image 302, resulting in generation of an updated transformed medical image 312'. In this regard, the updated transformation function 310' corresponds to an updated version of the previously generated transformation function 310, which in this case corresponds to the initial version of the transformation function generated by the transformation module 308 based on the predicted parameter values 306, in accordance with the operations described with reference to FIG. 3. In other words, the transformation module 308 reconfigures the transformation function in accordance with the mathematical definition of the transformation function and using the updated parameter values 608 as input, as opposed to using the predicted parameter values 306, resulting in generation of the updated transformation function 310'. The transformation module 308 further applies the updated transformation function 310' to the medical image 302, resulting in transformation of the medical image 302 to the updated transformed medical image 312', which is then rendered at 605 (e.g., via rendering component 116) via the GUI 604 instead of the last rendered version, which in this case is the default, transformed medical image 312.

In this regard, process 600 can be continuously performed in association with receiving new user input via the editing tool 606 indicating a new adjustment to the one or more values of the control parameters that control the appearance of the rendered, transformed version of the medical image 302. Each time new input is received, the editing tool 606 generates new updated parameter values 608, the transformation module 308 generates and applies a new updated transformation function to the medical image 302, resulting in generation of a new updated transformed medical image, and the rendering component 116 renders the new updated transformed version of the medical image via the GUI 604. The processing time required to receive, compute or determine the updated parameter values 608 based on the user input, generate and apply the updated transformation function to the medical image 302, and generate and render the updated transformed medical image, can take less than 1 second and even on the order of 10 milliseconds. Thus, each time new user input is received via the editing tool 606, the user can be presented with an updated version of the transformed medical image in real-time. Thus, the disclosed techniques provide for allowing the user to edit the transformed medical image displayed and view the results of the editing operations applied in real-time (e.g., within about 10 milliseconds of providing input corresponding to one or more changes to the previous parameter values of the control parameters of the transformation function).

Figure 7A:
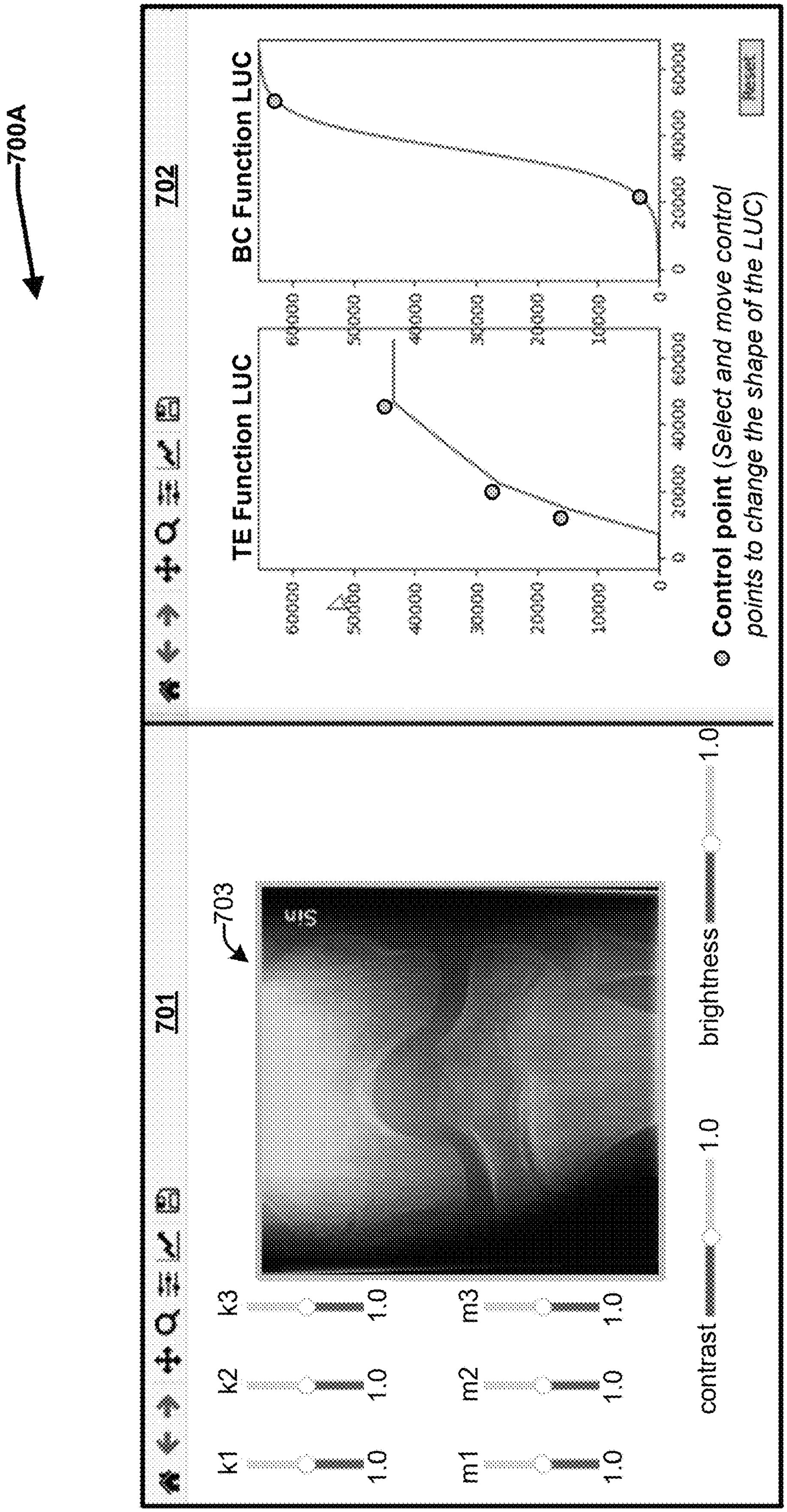
FIGS. 7A and 7B illustrate an example graphical user interface comprising an editing tool that facilitates viewing and editing output images generated by the AI transformation model, in accordance with one or more embodiments of the disclosed subject matter.
Figure 7B:
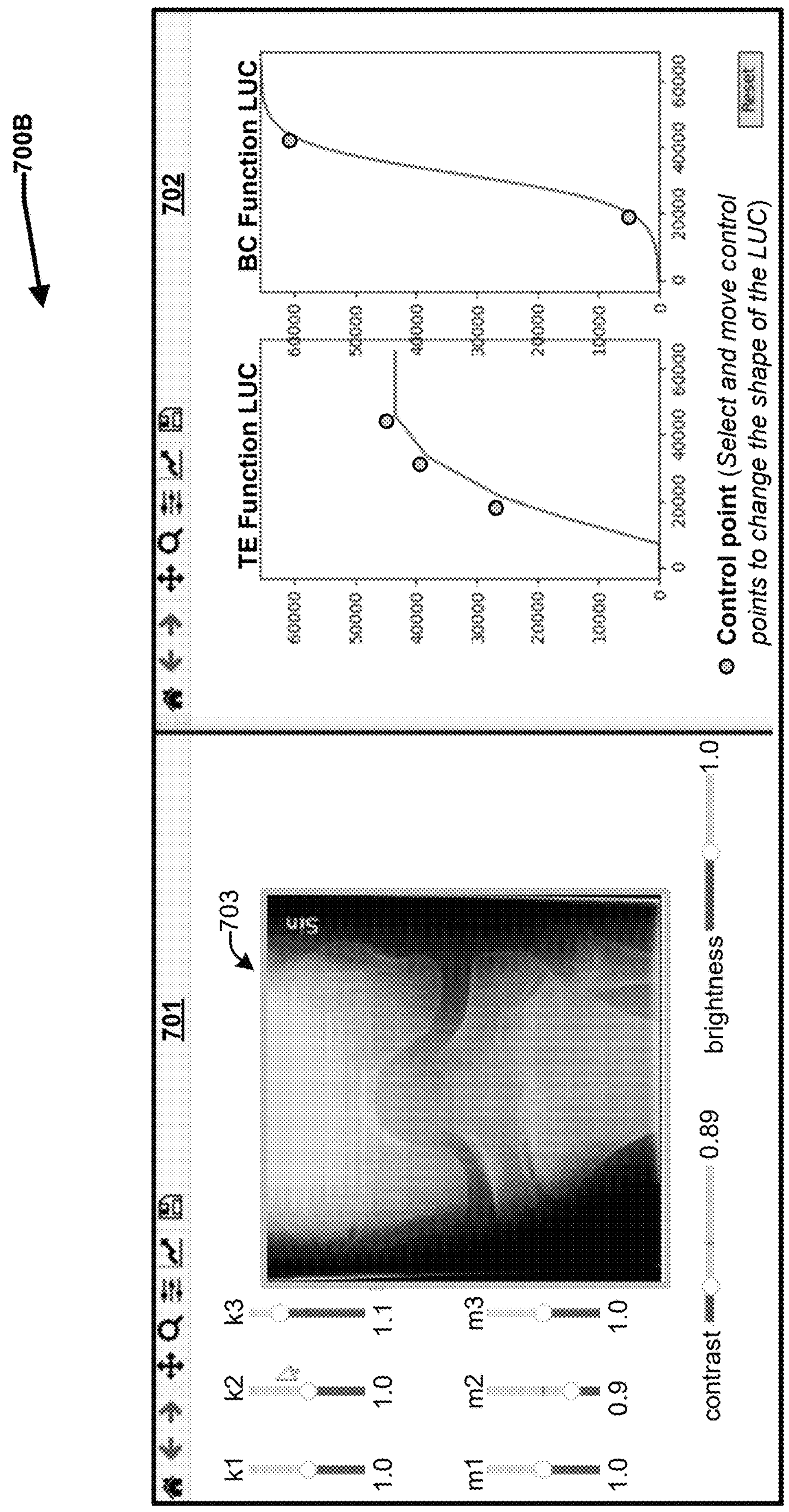
Figure 8:
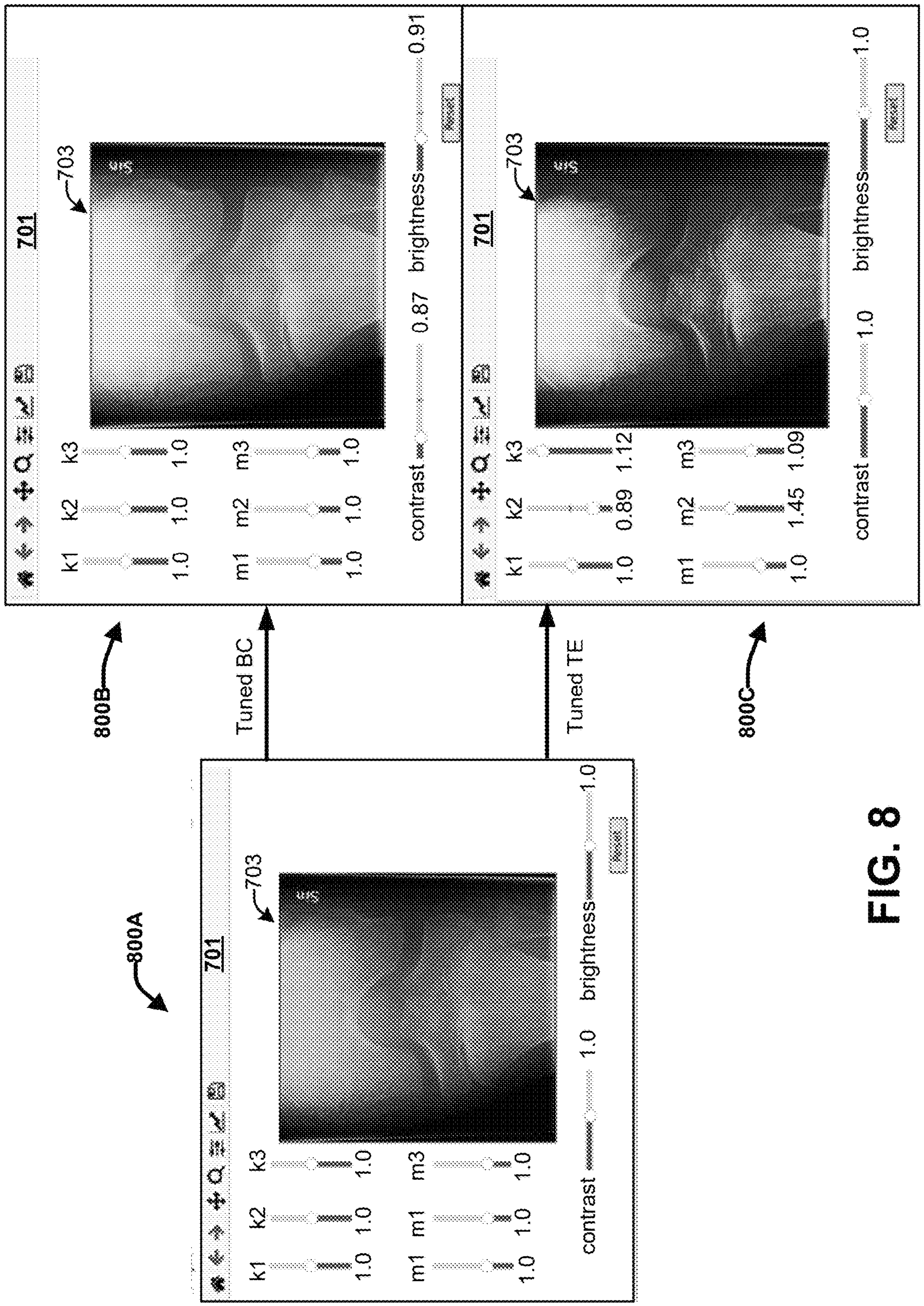
FIG. 8 presents comparative visualizations illustrating differences between applying a BC adjustment to the default output image and applying a TE adjustment to the default output image.

FIGS. 7A, 7B and 8 illustrate example implementations of GUI 604 and editing tool 606 in accordance with various, non-limiting embodiments. With reference to FIGS. 1-8, in accordance with the examples illustrated in FIGS. 7A, 7B and 8, the transformation function employed by the transformation module 308 includes a combination of both a TE transformation function and a BC transformation function. The AI transformation model 110 applied corresponds to an AI transformation model trained to transform XR images of a human knee into enhanced versions thereof with both TE enhancement and BC enhancement features.

With reference initially to FIG. 7A, FIG. 7A illustrates an example representation 700A of GUI 604 that can be presented via the medical imaging application 118 in response to generation of the initial or default transformed version of an input medical image by the AI transformation model 110. As shown in FIG. 7A, the GUI 604 can include a left-side window 701 comprising a display area 703 in which the transformed version of the input medical image is displayed. In representation 700A, the displayed transformed version of the input medical image (e.g., corresponding to input medical image 302) corresponds to the default or first transformed version (e.g., corresponding to transformed medical image 312) of the input medical image generated by the AI transformation model 110. The left-side window 701 also comprises several control sliders corresponding to different control parameters of the transformation function, including six sliders respectively corresponding to control parameters of the TE transformation function (e.g., the sliders for control parameters labeled k1, k2, k3, m1, m2 and m3), and two sliders corresponding to control parameters of the BC transformation function (e.g., the contrast and brightness sliders). The respective sliders are set to the default positions indicating the values of the respective control parameters corresponds to their default value, which is their current value as included in the transformation function (e.g., corresponding to transformation function 310). The value of 1.0 is used to indicate that the current values of the respective control parameters as configured in the transformation function correspond to their default value. It should be appreciated however that the actual default values of the respective control parameters can be different and do not correspond to the value of 1.0 per se. In various embodiments, the editing tool 606 facilitates receiving user input indicating an adjustment to one or more values of the control parameters of the transformation function in association with adjusting the corresponding control sliders. In this regard, the control sliders correspond to interactive graphical buttons that can be moved with respect to the slider bar to increase or decrease the value of the corresponding control parameter.

The GUI 604 can also include a right-side window 702 that displays the graphical LUC representations of the respective transformation functions. The graphical LUCs respectively include control points corresponding to control parameters of the respective functions. In some embodiments, the graphical LUCs can be interactive, such that the editing tool 606 enables the user to select and move the control points to change the shape of the corresponding curves, which in turn corresponds to changing the values of the corresponding control parameters.

FIG. 7B illustrates an example representation 700B of GUI 604 that can be presented via the medical imaging application 118 in response receiving user input via representation 700A adjusting one or more values of one or more control parameters of the transformation function. In this example, as shown in the left-side window, the user has increased the value of control parameter k3, decreased the value of control parameter m2, and decreased the value of the contrast control parameter. As can be seen by comparison of the image displayed in representation 700A relative to that displayed in 700B, as a result of adjusting the control parameters, the transformed image displayed in 700B has an adjusted appearance relative to the default transformed image. This adjusted was achieved in response to updating the transformation function based on the new values for control parameters k3, m2 and contrast, and applying the updated version of the transformation function to the original input medical image, resulting in generation of the transformed version of the input medical image shown in FIG. 7B, wherein the new values account for the degree and direction of adjustment provided by the user input via moving the corresponding control sliders. As described above, the processing time involved in updating the transformation function and applying the updated transformation function to the input medical image to generate the new transformed version can take less than 1 second, or even on the order of about 10 milliseconds. Accordingly, in association with providing input adjusting the control parameters via the GUI, the user can be presented with the results of the adjustment or editing commands in real-time (e.g., less than 1 second or even about 10 milliseconds).

As can also be seen by comparison of the LUCs shown in representation 700A and representation 700B, the adjustments made to the control parameters associated with the TE transformation function (e.g., k3 and m2 in this example) result in changing the shape of the TE function LUC and the corresponding positions (and thus the corresponding values) of the control points of the TE LUC. Likewise, the adjustments made to the control parameters associated with the BC transformation function (e.g., the brightness control parameter in this example), result in changing the shape of the BC function LUC and the corresponding positions (and thus the corresponding values) of the control points of the BC LUC.

Thus, in accordance with the example implementations of the GUI 604 shown in FIGS. 7A and 7B, the user can essentially adjust the control parameter sliders and/or the control points on the LUCs and view how the adjustment changes the appearance of the displayed image and the appearance of shape of the LUCs in real-time. Once the user has adjusted the control parameters in a manner that achieves a rendered image having the visual appearance properties desired by the user, the GUI can enable the user to save the final, transformed version of the medical image. In addition, in association with saving the final, transformed version of the medical image, the GUI can also enable the user to save the final configuration settings of the transformation function applied to generate the final, transformed version. In this regard, the final configuration settings correspond to the final values of the transformation function control parameters applied, which correspond to the final positions of the control slider settings and/or the final shapes of the corresponding LUCs. In some implementations of these embodiments, the user can request (e.g., via the GUI 604 or the like) to have the AI transformation model 110 re-apply the final configuration settings of the transformation function in association with generating additional transformed versions of additional XR images of the same anatomical region (i.e., the knee in this example). In other words, the user can request the editing tool 606 automatically adjust the appearance of additional transformed versions of medial images generated via the AI transformation model 110 to have an edited appearance corresponding to the final configuration settings preferred and saved by the user.

FIG. 8 presents comparative representations of the left-side window 701 of GUI 604 in accordance with the example embodiments shown in FIGS. 7A and 7B. The comparative representations illustrate differences between applying a BC adjustment to the default output image and applying a TE adjustment to the default output image. In this regard, representation 800A corresponds to the default configuration of the GUI 604 and displays the default output image with the control parameters set to their default value configuration. Representation 800B illustrates the resulting changes to the default output image in response to tuning only the BC transformation function control parameters (and leaving the TE transformation function control parameters at their default value settings), which in this example involved decreasing both the contrast and brightness parameters. Representation 800C illustrates the resulting changes to the default output image in response to tuning only the TE transformation function control parameters (and leaving the BC transformation function control parameters at their default value settings), which in this example involved decreasing the value of k2 and increasing the value of k3, m2 and m3.

FIG. 9 illustrates an example training process 900 for training the AI transformation model 110, in accordance with one or more embodiments of the disclosed subject matter. With reference to FIGS. 1-9, process 900 corresponds to an example process that can be performed by the training component 120 to generate a (trained) version of the AI transformation model 110 tailored to perform one or more transformation operations on a particular type of input medical image. As described previously, the particular type of input medical image can vary, yet will generally have a same modality and depict the same anatomical region yet captured from different patients/subject (among other parameters being the same or similar, such as acquisition parameters, acquisition perspective and the like). To this end, the training dataset 901 includes a plurality of training medical images corresponding to the particular type of input medical image that the AI transformation model 110 is being trained to transform. The transformation operations can also vary, so long as they are defined by differential transformation functions in the pixel intensity space. For example, the transformation operations can include a BC transformation operation (as controlled by a defined BC transformation function), a TE transformation operation (as controlled by a defined TE transformation), a combination of both the BC and the TE transformation operation, and/or another suitable transformation operation.

The training dataset 901 also includes, for each training medical image (excluding those used for a testing phase of the training process), a ground truth (GT) transformed version of the training medical image. The GT transformed version corresponds to a manually generated and/or artificially generated (e.g., using other existing medical image transformation solutions) transformed version of the training medical image having the preferred appearance that the AI transformation model 110 is being trained to create. In other words, the GT transformed version of each training medical image corresponds to a previously generated transformed version of the training medical image having the visual appearance properties desired to be achieved via the transformation operation or operations employed by the AI transformation model. For example, as applied to a combination of both the BC and the TE transformation operations, in some embodiments, the GT training medical image 904 for a given training medical image 902 can corresponds to a transformed version of training medical image with both BC and TE transformation operations applied thereto in an optimal manner. In other implementations as applied to a combination of different transformation operations, each training medical image can be associated with separate GT versions, one for each of the different transformation operations (e.g., a GT BC image and a GT TE image). With these implementations, the training process can involve performing the respective transformations separately to generate intermediate outputs in association with training the AI transformation model to converge on a combined output accounting for both transformations.

To this end, in accordance with an embodiment in which each training medical image is paired with a single GT version that accounts for one or more transformation operations, process 900 is described with reference to a single training image pair, that is training medical image 902 its GT training medical image 904 version. At 921, the training component 120 executes the AI transformation model 110 on the training medical image 902. This involves feeding the training medical image 902, or a down-sampled version thereof (e.g., LR training medical image 901, as generated via the preprocessing component 108) to the neural network module 304 which process the input image to generate predicted parameter values 906. As described with reference to FIG. 3, the predicted parameter values 906 correspond to values of predefined control parameters of the transformation function or functions to be applied to the training medical image 902 by the transformation module 308. The predicted parameter values 906 are generated by the parameter prediction layer 504 based on the features or feature embeddings of the training medical image 902 extracted from the training medical image by the image encoder 502. The transformation module 308 then generates (e.g., computes, configures, constructs, or the like) the transformation function 908 using the predicted parameter values in accordance with the defined mathematical equation of the transformation function, as provided in the model configuration data 114 (e.g., which can include one or more transformation functions, such as a BC transformation function, a TE transformation function, or a combination of both). The transformation module 308 further applies the transformation function 908 to the training medical image 902 to transform the training medical image 902 into the transformed training medical image 910.

At 922, the training component 120 compares the transformed training medical image to its GT version (e.g., GT training medical image 904) and computes a measure of loss (e.g., a Dice coefficient, a mean square error (MSE) metric, a mean average error (MAE) metric, or another suitable measure of loss) based on the visual similarity (or dissimilarity) between the respective images. At 923, the training component 120 tunes the neural network module based on the loss. For example, in some embodiments in which the image encoder 502 corresponds to an untrained image encoder 502, the training component 902 can jointly tune and optimize parameters of both the image encoder and the parameter prediction layers 504. This can involve adjusting parameter weights, filters, biases, latent space representations, activation functions, and so on, in a manner adapted to result in improving the accuracy of the values predicted by the parameter prediction layers 504. In other embodiments in which the image encoder 502 corresponds to a pretrained image encoder, such as pretrained foundation model image encoder, during the training process 900, the parameters of the pretrained image encoder can be frozen or otherwise left unchanged and the tuning performed during training only involves tuning the parameters of the parameter prediction layers 504.

In some embodiments, the training component 120 can repeat the same training process described above again one or more additional times for the same training medical image 902 and GT training medical image 904 pair. For example, the training component 120 can repeat the same training process for the same pair until the loss computed at 922 is acceptable, relative to a defined loss metric threshold. This corresponds to repeatedly transforming the training medical image 902 based on new predicted parameter values 906 generated each time (as a result of tuning the neural network module 304 each time) until the desired transformation results are achieved for the given training medical image 902. The training component 902 can then repeat the same process for the next training image set (e.g., the next training image+GT version pair), and so on until convergence is reached or another defined training process termination criterion is realized. In other embodiments, the training component 120 can process each training image set (e.g., each training image/GT version pair) via the transformation model 110 once before proceeding to the next training image set.

In other embodiments in which two or more different transformation functions are involved and in which each training medical image comprises separate GT transformed version for each transformation function, the training process employed can correspond to process 900 with the following noted modifications. In this regard, let's assume for example that the different transformation functions include a BC transformation function and a TE transformation function. With these embodiments, the predicted parameter values 906 can include parameter values for both transformation functions, that is BC predicted control parameter values for the BC transformation function and TE predicted control parameter values for the TE transformation function. The transformation module 308 can further construct the separate transformation functions according to their mathematical definitions and using the applicable control parameter values. However as opposed to applying both transformation functions to the training image jointly to generate a single output image, the training component 120 can apply them separately to generate two separate output images, that is a BC transformed medical image with the BC transformation function applied, and a TE transformed medical image with the TE transformation function applied. In association with computing the loss at 922, the training component can compute two loss measures, one based on comparison of the BC transformed image to its corresponding GT transformed BC image, and a based on comparison of the TE transformed image to its corresponding TE transformed image. In some implementations of these embodiments, in association with tuning the image encoder 502 and/or the parameter prediction layer 504 of the neural network module 304, the training component 120 can compute an aggregate loss measure based on the combined loss and tune the respective neural network parameters according to the aggregate loss measure. In other implementations of these embodiments, the training component 120 can tailor the tuning of the subset of the neural network parameters related to the BC transformation function control parameters based on the BC loss, and separately tailor another subset of the neural network parameters related to the TE transformation function control parameters based on the TE loss.

Figure 10:
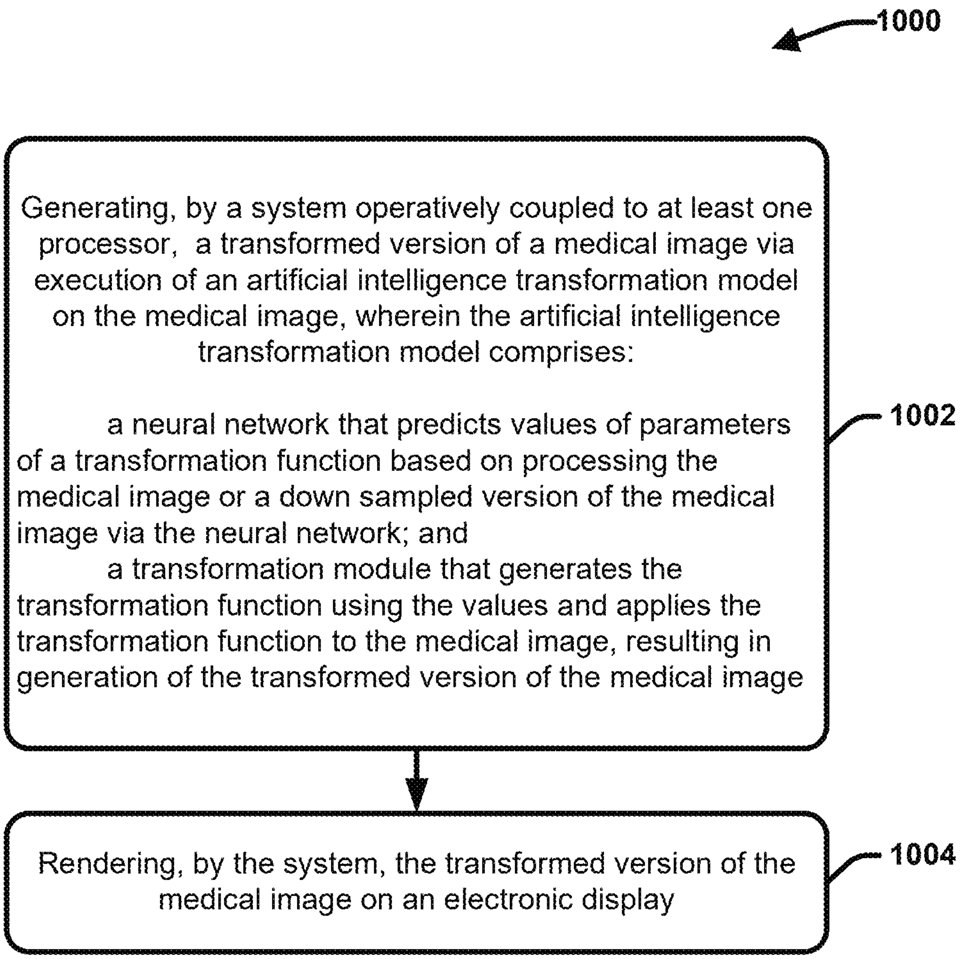
FIG. 10 presents a flow diagram of an example, computer-implemented method that facilitates medical image enhancement using an AI transformation model with editable output image appearance control, in accordance with one or more embodiments of the disclosed subject matter.

FIG. 10 presents a flow diagram of an example, computer-implemented method 1000 that facilitates medical image enhancement using an AI transformation model with editable output image appearance control, in accordance with one or more embodiments of the disclosed subject matter. Method 1000 comprises, at 1002, generating, generating, by a system operatively coupled to at least one processor (e.g., computing system 100), a transformed version (e.g., transformed medical image 312) of a medical image (e.g., medical image 302) via execution (e.g., via execution component 112) of an artificial intelligence transformation model (e.g., AI transformation model 110) on the medical image, wherein the artificial intelligence transformation model comprises a neural network (e.g., image encoder 502 and/or parameter prediction layers 504) that predicts values of parameters of a transformation function based on processing the medical image or a down sampled version of the medical image via the neural network, and a transformation module (e.g., transformation module 308) that generates the transformation function using the values and applies the transformation function to the medical image, resulting in generation of the transformed version of the medical image. At 1004, method 1000 comprise rendering, by the system (e.g., via rendering component 116), the transformed version of the medical image on an electronic display (e.g., electronic display 602, or the like).

Figure 11:
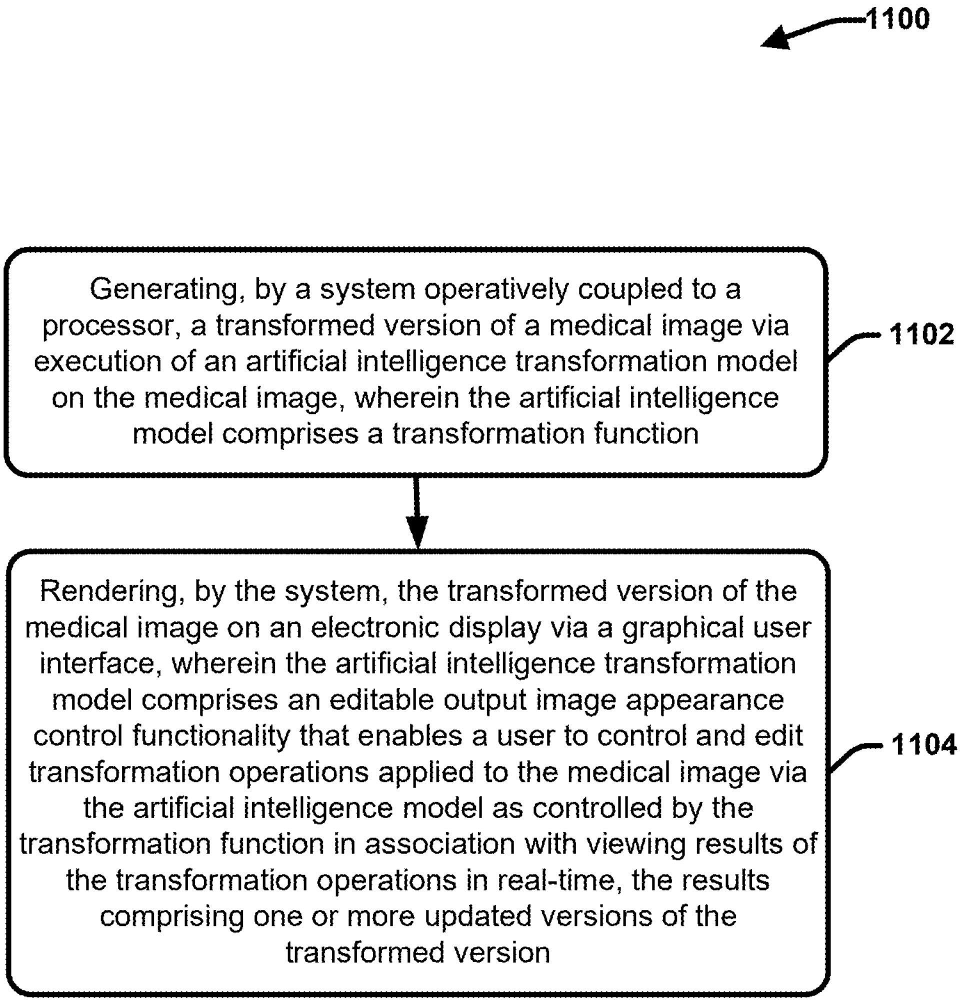
FIG. 11 presents a flow diagram of another example, computer-implemented method that facilitates medical image enhancement using an AI transformation model with editable output image appearance control, in accordance with one or more embodiments of the disclosed subject matter.

FIG. 11 presents a flow diagram of another example, computer-implemented method 1100 that facilitates medical image enhancement using an AI transformation model with editable output image appearance control, in accordance with one or more embodiments of the disclosed subject matter. Method 1100 comprises, at 1102, generating, by a system operatively coupled to a processor (e.g., computing system 100), a transformed version of a medical image via execution of an artificial intelligence model (e.g., AI transformation model 110) on a medical image (e.g., medical image 302), wherein the artificial intelligence model comprises a transformation function (e.g., transformation function 310). At 1104, method 1100 comprises rendering, by the system (e.g., via rendering component 116), the transformed version of the medical image on an electronic display (e.g., electronic display 602) via a graphical user interface (e.g., medical imaging application GUI 604, or the like), wherein the AI transformation model comprises an editable output image appearance control functionality that enables a user to control and edit transformation operations applied to the medical image via the artificial intelligence model as controlled by the transformation function in association with viewing results of the transformation operations in real-time, the results comprising one or more updated versions of the transformed version.

FIG. 12 presents a flow diagram of another example, computer-implemented method 1200 that facilitates medical image enhancement using an AI transformation model with editable output image appearance control, in accordance with one or more embodiments of the disclosed subject matter. Method 1200 comprises, at 1202, generating, by a system operatively coupled to a processor (e.g., computing system 100), a transformed version of a medical image via execution of an artificial intelligence model (e.g., AI transformation model 110) on a medical image (e.g., medical image 302), wherein the artificial intelligence model comprises a transformation function (e.g., transformation function 310). At 1204, method 1200 comprises rendering, by the system (e.g., via rendering component 116), the transformed version of the medical image on an electronic display (e.g., electronic display 602). At 1206, method 1200 comprises providing, by the system, via a graphical user interface rendered on the electronic display (e.g., GUI 604), an editing tool (e.g., editing tool 606) that facilitates receiving user input indicating an adjustment to one or more values of one or more parameters of the transformation function that control an appearance of the transformed version. At 1208, method 1200 comprises updating, by the system in response to reception of the user input (e.g., via transformation module 308), the transformation function in accordance with the adjustment, resulting in an updated version of the transformation function (e.g., updated transformation function 310'). At 1210, method 1200 comprises generating, by the system, an updated transformed version of the medical image via application of the updated version of the transformation function to the medical image (e.g., via transformation module 308). At 1212, method 1200 comprises rendering, by the system, the updated transformed version of the medical image on the electronic display.

One or more embodiments can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, procedural programming languages, such as the "C" programming language or similar programming languages, and machine-learning programming languages such as like CUDA, Python, Tensorflow, PyTorch, and the like. The computer readable program instructions can execute entirely on the user's computer, partly on the user's computer, as a stand-alone software package, partly on the user's computer and partly on a remote computer or entirely on the remote computer or server using suitable processing hardware. In the latter scenario, the remote computer can be connected to the user's computer through any type of network, including a local area network (LAN) or a wide area network (WAN), or the connection can be made to an external computer (for example, through the Internet using an Internet Service Provider). In various embodiments involving machine-learning programming instructions, the processing hardware can include one or more graphics processing units (GPUs), central processing units (CPUs), and the like. For example, one or more of the disclosed models (e.g., AI transformation model 110, image encoder 502, parameter prediction layer 504, transformation model 310, and/or combinations thereof) may be written in a suitable machine-learning programming language and executed via one or more GPUs, CPUs or combinations thereof. In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It can be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession may, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In connection with FIG. 13, the systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which can be explicitly illustrated herein.

Figure 13:
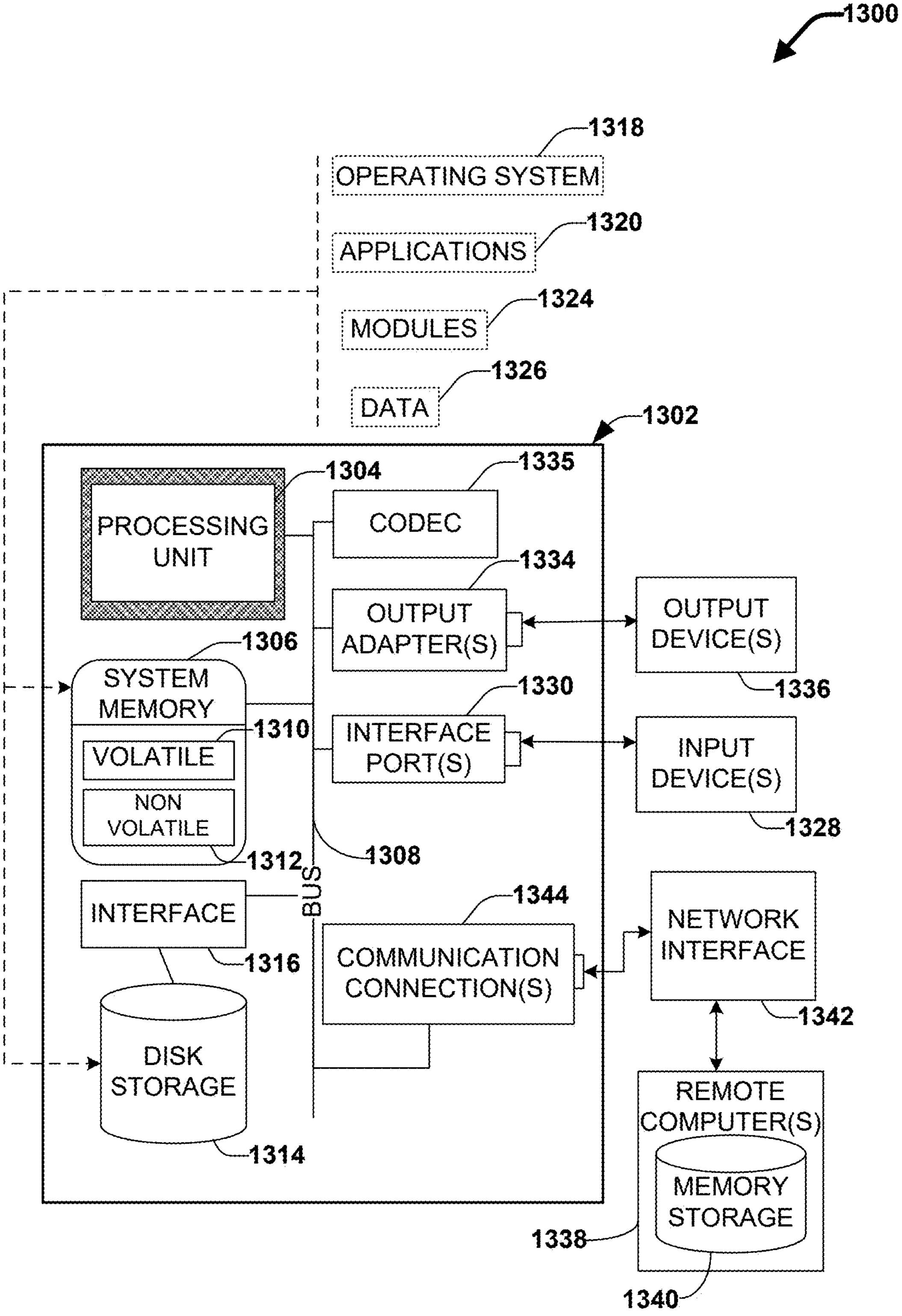
FIG. 13 illustrates a block diagram of an example, non-limiting operating environment in which one or more embodiments described herein can be facilitated.

With reference to FIG. 13, an example environment 1300 for implementing various aspects of the claimed subject matter includes a computer 1302. The computer 1302 includes a processing unit 1304, a system memory 1306, a codec 1335, and a system bus 1308. The system bus 1308 couples system components including, but not limited to, the system memory 1306 to the processing unit 1304. The processing unit 1304 can be any of various available processors. Dual microprocessors, one or more GPUs, CPUs, and other multiprocessor architectures also can be employed as the processing unit 1304.

The system bus 1308 can be any of several types of bus structure(s) including the memory bus or memory controller, a peripheral bus or external bus, or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1306 includes volatile memory 1310 and non-volatile memory 1312, which can employ one or more of the disclosed memory architectures, in various embodiments. The basic input/output system (BIOS), containing the basic routines to transfer information between elements within the computer 1302, such as during start-up, is stored in non-volatile memory 1312. In addition, according to present innovations, codec 1335 can include at least one of an encoder or decoder, wherein the at least one of an encoder or decoder can consist of hardware, software, or a combination of hardware and software. Although, codec 1335 is depicted as a separate component, codec 1335 can be contained within non-volatile memory 1312. By way of illustration, and not limitation, non-volatile memory 1312 can include read only memory (ROM), programmable ROM (PROM), electrically programmable ROM (EPROM), electrically erasable programmable ROM (EEPROM), Flash memory, 3D Flash memory, or resistive memory such as resistive random access memory (RRAM). Non-volatile memory 1312 can employ one or more of the disclosed memory devices, in at least some embodiments. Moreover, non-volatile memory 1312 can be computer memory (e.g., physically integrated with computer 1302 or a mainboard thereof), or removable memory. Examples of suitable removable memory with which disclosed embodiments can be implemented can include a secure digital (SD) card, a compact Flash (CF) card, a universal serial bus (USB) memory stick, or the like. Volatile memory 1310 includes random access memory (RAM), which acts as external cache memory, and can also employ one or more disclosed memory devices in various embodiments. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM) and so forth.

Computer 1302 can also include removable/non-removable, volatile/non-volatile computer storage medium. FIG. 13 illustrates, for example, disk storage 1314. Disk storage 1314 includes, but is not limited to, devices like a magnetic disk drive, solid state disk (SSD), flash memory card, or memory stick. In addition, disk storage 1314 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1314 to the system bus 1308, a removable or non-removable interface is typically used, such as interface 1316. It is appreciated that disk storage 1314 can store information related to a user. Such information might be stored at or provided to a server or to an application running on a user device. In one embodiment, the user can be notified (e.g., by way of output device(s) 1336) of the types of information that are stored to disk storage 1314 or transmitted to the server or application. The user can be provided the opportunity to opt-in or opt-out of having such information collected or shared with the server or application (e.g., by way of input from input device(s) 1328).

It is to be appreciated that FIG. 13 describes software that acts as an intermediary between users and the basic computer resources described in the suitable operating environment 1300. Such software includes an operating system 1318. Operating system 1318, which can be stored on disk storage 1314, acts to control and allocate resources of the computer 1302. Applications 1320 take advantage of the management of resources by operating system 1318 through program modules 1324, and program data 1326, such as the boot/shutdown transaction table and the like, stored either in system memory 1306 or on disk storage 1314. It is to be appreciated that the claimed subject matter can be implemented with various operating systems or combinations of operating systems.

A user enters commands or information into the computer 1302 through input device(s) 1328. Input devices 1328 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1304 through the system bus 1308 via interface port(s) 1330. Interface port(s) 1330 include, for example, a serial port, a parallel port, a game port, and a universal serial bus (USB). Output device(s) 1336 use some of the same type of ports as input device(s) 1328. Thus, for example, a USB port can be used to provide input to computer 1302 and to output information from computer 1302 to an output device 1336. Output adapter 1334 is provided to illustrate that there are some output devices 1336 like monitors, speakers, and printers, among other output devices 1336, which require special adapters. The output adapters 1334 include, by way of illustration and not limitation, video and sound cards that provide a means of connection between the output device 1336 and the system bus 1308. It should be noted that other devices or systems of devices provide both input and output capabilities such as remote computer(s) 1338.

Computer 1302 can operate in a networked environment using logical connections to one or more remote computers, such as remote computer(s) 1338. The remote computer(s) 1338 can be a personal computer, a server, a router, a network PC, a workstation, a microprocessor based appliance, a peer device, a smart phone, a tablet, or other network node, and typically includes many of the elements described relative to computer 1302. For purposes of brevity, only a memory storage device 1340 is illustrated with remote computer(s) 1338. Remote computer(s) 1338 is logically connected to computer 1302 through a network interface 1342 and then connected via communication connection(s) 1344. Network interface 1342 encompasses wire or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1344 refers to the hardware/software employed to connect the network interface 1342 to the bus 1308. While communication connection 1344 is shown for illustrative clarity inside computer 1302, it can also be external to computer 1302. The hardware/software necessary for connection to the network interface 1342 includes, for exemplary purposes only, internal and external technologies such as, modems including regular telephone grade modems, cable modems and DSL modems, ISDN adapters, and wired and wireless Ethernet cards, hubs, and routers.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration and are intended to be non-limiting. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations can be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:

a memory that stores computer-executable components; and a processor that executes the computer-executable components stored in the memory, wherein the computer-executable components comprise:

an execution component that generates a transformed version of a medical image via execution of a transformation model on the medical image, wherein the transformation model comprises:

a neural network that processes the medical image or a down sampled version of the medical image to predict values of parameters of a transformation function; and a transformation module that configures the transformation function using the values, resulting in a first configured version of the transformation function, and applies the first configured version of the transformation function to the medical image, to generate the transformed version of the medical image; and a rendering component that renders the transformed version of the medical image on an electronic display via a graphical user interface.

2. The system of claim 1, wherein the graphical user interface comprises an editing tool that facilitates receiving user input indicating an adjustment to one or more of the values that controls an appearance of the transformed version, wherein in response to reception of the user input, the transformation module updates the transformation function in accordance with the adjustment, resulting in a second configured version of the transformation function, and applies the second configured version of the transformation function to the medical image to generate an updated transformed version of the medical image without reapplying the neural network to the medical image or the down sampled version of the medical image, and wherein the rendering component renders the updated transformed version of the medical image on the electronic display via the graphical user interface.

3. The system of claim 2, wherein the editing tool comprises interactive parameter control information, and wherein the editing tool facilitates receiving the user input in association with adjusting the interactive parameter control information via the graphical user interface.

4. The system of claim 2, wherein the editing tool comprises an interactive graphical representation of the transformation function, and wherein the editing tool facilitates receiving the user input via the interactive graphical representation.

5. The system of claim 1, wherein the transformation function comprises mapping information defining a mapping between input pixel intensities of respective pixels of the medical image and output pixel intensities for corresponding pixels of the transformed version, wherein the transformation module generates the mapping information in accordance with the values and predefined relationships between the parameters, and wherein the transformation module adjusts the input pixel intensities in accordance with the mapping information, resulting in the generation of the transformed version of the medical image.

6. The system of claim 5, wherein the mapping information corresponds to a graphical look-up curve.

7. The system of claim 5, wherein the values comprise per pixel values of the parameters for each pixel of the respective pixels.

8. The system of claim 1, wherein the neural network comprises a combination of a convolutional neural network encoder and regression layers and excludes a decoder neural network, wherein the transformation function comprises a pixel intensity transformation function, and wherein the transformed version of the medical image comprises a pixel intensity transformed version of the medical image without artifacts as a result of the neural network excluding the decoder neural network.

9. The system of claim 1, wherein the computer-executable components further comprise:

a training component that trains the neural network based on a training dataset, wherein the training dataset includes training medical images and ground-truth transformed versions of the training medical images.

10. The system of claim 9, wherein the training component trains the transformation model using a training process that comprises, for each training medical image:

predicting, via the neural network, training values of the parameters of the transformation function based on processing the training medical image or a down sampled version of the training medical image via the neural network;

generating, via the transformation module, a tailored version of the transformation function for the training medical image using the training values;

applying, via the transformation module, the tailored version of the transformation function to the training medical image, resulting in generation of a training transformed version of the training medical image; and tuning, by the system, network parameters of the neural network based on a measure of loss between the training transformed version and a corresponding ground-truth transformed version of the training medical image.

11. The system of claim 1, wherein the transformation function comprises a combination of two or more different transformation functions.

12. A method, comprising:

applying, by a system operatively coupled to a processor, a neural network model to a medical image or a down sampled version of the medical image to predict values of parameters of a transformation function;

configuring, by the system, the transformation function using the values, resulting in a first configured version of the transformation function;

applying, by the system, the first configured version of the transformation function to the medical image to generate the transformed version of the medical image; and rendering, by the system, the transformed version of the medical image on an electronic display via a graphical user interface.

13. The method of claim 12, further comprising:

providing, by the system via the graphical user interface, an editing tool that facilitates receiving user input indicating an adjustment to one or more of the values that controls an appearance of the transformed version;

updating, by the system in response to reception of the user input, the first configured version of the transformation function in accordance with the adjustment, resulting in a second configured version of the transformation function;

applying, by the system, the second configured version of the transformation function to the medical image to generate an updated transformed version of the medical image without reapplying the neural network to the medical image or the down sampled version of the medical image; and rendering, by the system, the updated transformed version of the medical image on the electronic display via the graphical user interface.

14. The method of claim 13, wherein the editing tool comprises interactive parameter control information, and wherein the editing tool facilitates receiving the user input in association with adjusting the interactive parameter control information via the graphical user interface.

15. The method of claim 12, wherein the first configured version of the transformation function comprises mapping information defining a mapping between input pixel intensities of respective pixels of the medical image and output pixel intensities for corresponding pixels of the transformed version, and wherein configuring the transformation function comprises generating the mapping information in accordance with the values and predefined relationships between the parameters.

16. The method of claim 15, wherein the applying the first configured version of the transformation function comprises adjusting the input pixel intensities in accordance with the mapping information, and wherein the mapping information corresponds to a graphical look-up curve.

17. The method of claim 12, further comprising:

training, by the system, the neural network model based on a training dataset, wherein the training dataset includes training medical images and ground-truth transformed versions of the training medical images.

18. The method of claim 17, wherein the training comprises, for each training medical image:

predicting, via the neural network model, training values of the parameters of the transformation function based on processing the training medical image or a down sampled version of the training medical image via the neural network;

generating, via the transformation module, a tailored version of the transformation function for the training medical image using the training values;

applying, via the transformation module, the tailored version of the transformation function to the training medical image, resulting in generation of a training transformed version of the training medical image; and tuning, by the system, network parameters of the neural network based on a measure of loss between the training transformed version and a corresponding ground-truth transformed version of the training medical image.

19. A non-transitory machine-readable storage medium, comprising executable instructions that, when executed by a processor, facilitate performance of operations, comprising:

generating a transformed version of a medical image via execution of a transformation model on the medical image, wherein the transformation model comprises a neural network model and a transformation function;

rendering the transformed version of the medical image on an electronic display;

providing, via a graphical user interface rendered on the electronic display, an editing tool that facilitates receiving user input indicating an adjustment to one or more values of one or more parameters of the transformation function that controls an appearance of the transformed version;

in response to reception of the user input, updating the transformation function in accordance with the adjustment, resulting in an updated version of the transformation function;

applying the updated version of the transformation function to the medical image to generate an updated transformed version of the medical image without applying the neural network model to the medical image; and rendering the updated transformed version of the medical image on the electronic display.

20. The non-transitory machine-readable storage medium of claim 19, wherein the neural network comprises a combination of a convolutional neural network encoder and regression layers and excludes a decoder neural network, wherein the transformation function comprises a pixel intensity transformation function, and wherein the transformed version of the medical image comprises a pixel intensity transformed version of the medical image without artifacts as a result of the neural network excluding the decoder neural network.

* * * * *